US012663911B1

(12) United States Patent
Sandt, Jr. et al.

(10) Patent No.: US 12,663,911 B1
(45) Date of Patent: Jun. 23, 2026

(54) METHOD AND SYSTEM FOR RECONFIGURING A PLURALITY OF ICONS ON A GRAPHICAL USER INTERFACE TO OPTIMIZE MEMORY USAGE AND DATA TRANSMISSION EFFICIENCY

(71) Applicant: The PNC Financial Services Group, Inc., Pittsburgh, PA (US)

(72) Inventors: Robert Peter Sandt, Jr., Park Ridge, NJ (US); Jared John Grunig, Chanhassen, MN (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 254 days.

(21) Appl. No.: 18/645,501

(22) Filed: Apr. 25, 2024

Related U.S. Application Data

(60) Provisional application No. 63/499,044, filed on Apr. 28, 2023.

(51) Int. Cl.
| | |
|---|---|
| *G06F 3/04817* | (2022.01) |
| *G06F 3/0482* | (2013.01) |
| *G06F 3/0483* | (2013.01) |
| *G06F 3/04847* | (2022.01) |
| *G06F 9/451* | (2018.01) |

(52) U.S. Cl.
CPC ........ *G06F 3/04817* (2013.01); *G06F 3/0482* (2013.01); *G06F 3/0483* (2013.01); *G06F 3/04847* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 2007/0174341 A1 * | 7/2007 | Saripalli | G06Q 30/0603 |
| 2013/0166332 A1 * | 6/2013 | Hammad | G06Q 20/12 |
| | | | 705/28 |
| 2016/0300204 A1 * | 10/2016 | Guido | G06Q 20/108 |
| 2018/0335928 A1 * | 11/2018 | Van Os | G06Q 20/204 |

* cited by examiner

*Primary Examiner* — Tuan S Nguyen
(74) *Attorney, Agent, or Firm* — FINNEGAN, HENDERSON, FARABOW, GARRETT & DUNNER, LLP

(57) ABSTRACT
A method for reconfiguring a plurality of icons on a graphical user interface to optimize memory usage and data transmission efficiency, wherein each of the plurality of icons is associated with an entity, the method comprising: receiving a data set for a plurality of first entities; determining a weighted average of the historical data associated with the first entity; determining a vesting class based on the determined weighted average; generating a directory entry for each first entity; storing, in each directory entry, the first entity identifier, the electronic transfer identifier, the vesting date, and the determined vesting class; receiving a transfer authorization; determining a transfer permission based on the vesting class and the vesting date; receiving a user selection to reorganize the plurality of icons; sorting the plurality of first entities into a plurality of lists; and automatically reconfiguring the plurality of icons on the graphical user interface.

20 Claims, 23 Drawing Sheets

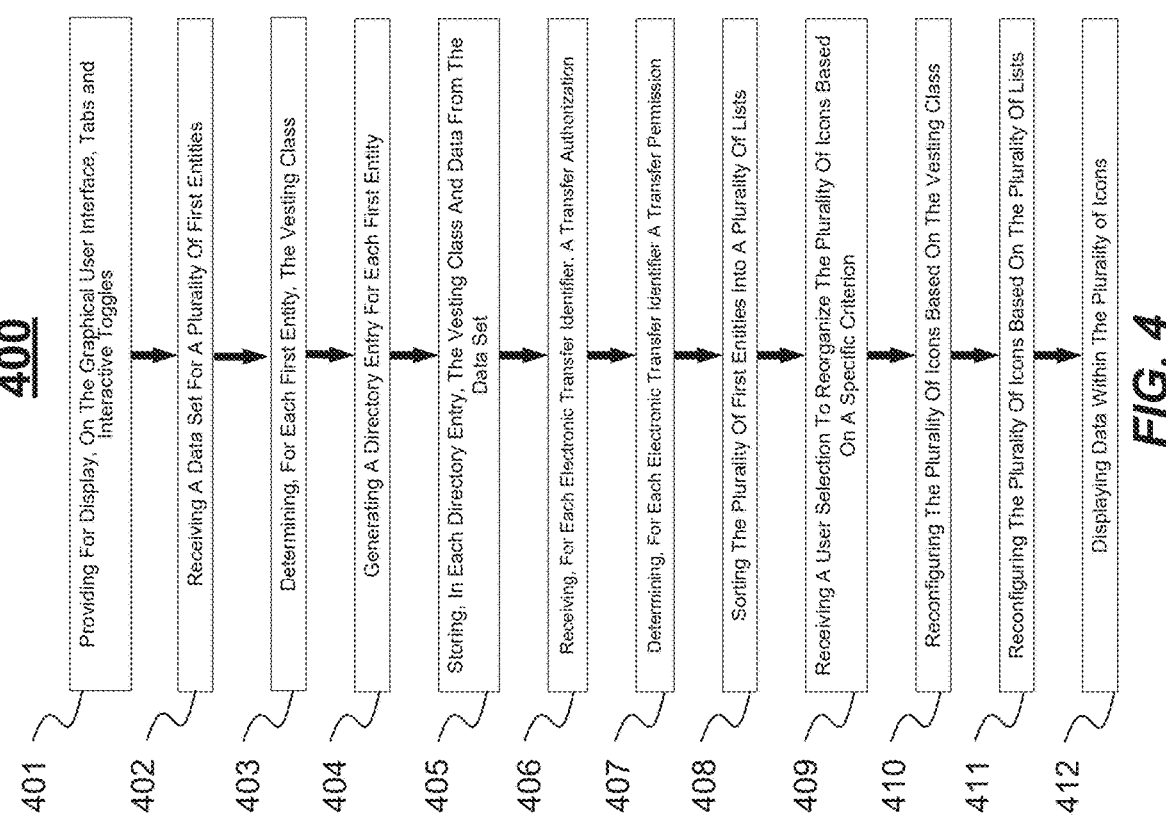

400

401 Providing For Display, On The Graphical User Interface, Tabs and Interactive Toggles 402 Receiving A Data Set For A Plurality Of First Entities 403 Determining, For Each First Entity, The Vesting Class 404 Generating A Directory Entry For Each First Entity 405 Storing, In Each Directory Entry, The Vesting Class And Data From The Data Set 406 Receiving, For Each Electronic Transfer Identifier, A Transfer Authorization 407 Determining, For Each Electronic Transfer Identifier A Transfer Permission 408 Sorting The Plurality Of First Entities Into A Plurality Of Lists 409 Receiving A User Selection To Reorganize The Plurality Of Icons Based On A Specific Criterion 410 Reconfiguring The Plurality Of Icons Based On The Vesting Class 411 Reconfiguring The Plurality Of Icons Based On The Plurality Of Lists 412 Displaying Data Within The Plurality of Icons

Data Set for an First Entity 501

Recipient First Entity Identifier — Memory Pointer 502

Recipient First Entity Vesting Class — Memory Pointer 503

Vesting Date for the Electronic Transfer — Memory Pointer 504

Transfer Authorization Input by the Second Entity — Memory Pointer 505

Upcoming Electronic Transfer Contents — Memory Pointer 506

302

METHOD AND SYSTEM FOR RECONFIGURING A PLURALITY OF ICONS ON A GRAPHICAL USER INTERFACE TO OPTIMIZE MEMORY USAGE AND DATA TRANSMISSION EFFICIENCY

CROSS-REFERENCE TO RELATED APPLICATION

This application claims the benefit of priority of U.S. Provisional Patent Application No. 63/499,044, filed on Apr. 28, 2023, the entire contents of which are incorporated herein by reference.

TECHNICAL FIELD

The present disclosure relates to methods and systems for reconfiguring a plurality of icons on a graphical user interface to optimize memory usage and data transmission efficiency.

BACKGROUND

Scheduling and tracking electronic transfers has become necessary between entities such as between individuals, between organizations and between organizations and individuals. Conventional methods and systems allow for entities to track and schedule electronic transfers made from their repositories, such as file storage locations or repositories for funds, like bank accounts, to their transferees. However, conventional methods and systems for achieving such scheduling and tracking of electronic transfers require processing voluminous data associated with the entities (e.g., employment data, historical data). Accordingly, conventional methods and systems perform electronic transfers at a reduced computation efficiency. Additionally, conventional systems and methods require a greater memory allocation to store, send, and process voluminous data to schedule and track electronic transfers.

Accordingly, there is a need for easier and more efficient ways to perform electronic transfer scheduling and tracking that are more memory and computationally efficient. As explained in the disclosed embodiments below, computational efficiency may be served by storing vesting classes centrally to reduce the amount of data processing and transmission necessary to schedule and track electronic transfers.

SUMMARY

Embodiments of the present disclosure may provide a method for reconfiguring a plurality of icons on a graphical user interface to optimize memory usage and data transmission efficiency, wherein each of the plurality of icons may be associated with an entity. The method may comprise providing for display, on the graphical user interface: at least one first tab, wherein each first tab is associated with a vesting class, a plurality of second tabs, wherein each second tab is associated with one of a plurality of lists, a first interactive toggle for setting a transfer authorization, and a second interactive toggle for reconfiguring the plurality of icons based on a specific criterion. The method may further comprise receiving a data set for a plurality of entities, wherein the data set may include, for each of the plurality of entities, a first entity identifier, an electronic identifier associated with the first entity, or a vesting date associated with the electronic transfer identifier. The method may further comprise determining, for each first entity, the vesting class based on the received data set, generating a directory entry for each first entity, wherein each directory entry is stored in a directory associated with a second entity, storing, in each directory entry, the first entity identifier associated with the first entity, the electronic transfer identifier associated with the first entity, the vesting date associated with the electronic transfer identifier, and the determined vesting class associated with the first entity, receiving, via the first interactive toggle in the graphical user interface, for each electronic transfer identifier, the transfer authorization associated with the electronic transfer identifier, determining, for each electronic transfer identifier, a transfer permission associated with the electronic transfer identifier based on the vesting class and the vesting date, sorting the plurality of first entities into the plurality of lists based on the determined transfer permissions associated with each electronic transfer identifier and the transfer authorizations associated with each electronic transfer identifier, and receiving, via the second interactive toggle in the graphical user interface, a user selection to reconfigure the plurality of icons based on a specific criterion, wherein the specific criterion is the transfer permission, the transfer authorization, and the vesting class. The method may further include responsive to receiving the user selection to reconfigure the plurality of icons, automatically reconfiguring the plurality of icons on the graphical user interface based on vesting class, wherein each icon is visually displayed in one of the at least one first tabs based on vesting class, automatically reconfiguring the plurality of icons on the graphical user interface based on the plurality of lists, wherein each icon is visually displayed in one of the plurality of second tabs based on the plurality of lists, and displaying, within each icon on the graphical user interface, at least one of the first entity identifier associated with the first entity, the electronic transfer identifier associated with the first entity, the transfer permission associated with the electronic transfer identifier, or the transfer authorization associated with the electronic transfer identifier.

According to an embodiment of the present disclosure, the method may further comprise automatically recoloring the plurality of icons on the graphical user interface.

According to an embodiment of the present disclosure, automatically recoloring may comprise one or more of: automatically coloring an icon green if the transfer permission is set to permitted and the transfer authorization is set to authorized, automatically coloring an icon red if the transfer permission is set to permitted and the transfer authorized is set to not authorized, and automatically coloring an icon grey if the transfer permission is set to not permitted.

According to an embodiment of the present disclosure, the method may further comprise providing for display, on the graphical user interface, a confirmation modal, receiving authorization evidence via the confirmation modal, and storing the authorization evidence in the directory entry associated with the first entity associated with the electronic transfer the transfer authorization was received for.

According to an embodiment of the present disclosure, the first interactive toggle may indicate a transfer authorization at at least one of the following levels: a vesting class level, an amount level, or a date level.

According to an embodiment of the present disclosure, the vesting class may be one of default, accelerated, or terminated.

According to an embodiment of the present disclosure, determining the transfer permission based on the vesting class and the vesting date may further comprise setting the transfer permission to permitted if the vesting class is accelerated.

According to an embodiment of the present disclosure, determining the transfer permission based on the vesting class and the vesting date may further comprise setting the transfer permission to permitted if the vesting class is default and the vesting date is not in the future.

According to an embodiment of the present disclosure, determining the transfer permission based on the vesting class and the vesting date may further comprise setting the transfer permission to not permitted if the vesting class is default and the vesting date is in the future.

According to an embodiment of the present disclosure, determining the transfer permission based on the vesting class and the vesting date further may comprise setting the transfer permission to not permitted if the vesting class is terminated.

According to an embodiment of the present disclosure, determining, for each first entity, a vesting class based on the determined weighted average may further comprise setting the vesting class to default if the weighed average falls below a predetermined threshold, wherein the predetermined threshold is a number on a scale.

According to an embodiment of the present disclosure, determining, for each first entity, a vesting class based on the determined weighted average may further comprises setting the vesting class to accelerated if the weighted average falls above a predetermined threshold, wherein the predetermined threshold is a number on a scale.

According to an embodiment of the present disclosure, the directory associated with the second entity may be stored in a memory accessible by the second entity, and wherein the second entity may add new directory entries by inputting a supplemental first entity data set.

According to an embodiment of the present disclosure, the directory associated with the second entity may be stored in a memory accessible by the second entity, and wherein the second entity may update existing directory entries, including updating the vesting class of any given first entity, by inputting a supplemental first entity data set.

According to an embodiment of the present disclosure, the second entity may be associated with a second entity repository, and wherein each first entity may be associated with a first entity repository.

According to an embodiment of the present disclosure, the data set for the plurality of first entities may further comprise, for each first entity, a first repository status and a first repository type.

According to an embodiment of the present disclosure, the method may further comprise performing an electronic transfer associated with an electronic transfer identifier from the second entity repository to at least one first entity repository.

According to an embodiment of the present disclosure, each first entity may access and view the first entity data set associated with the first entity on the graphical user interface, wherein the display of the graphical user interface may be divided into tabs, including at least one tab for each electronic transfer identifier associated with the first entity.

Embodiments of the present disclosure may provide a non-transitory computer readable medium storing instructions that, when executed by at least one processor, cause the at least one processor to perform operations for reconfiguring a plurality of icons on a graphical user interface to optimize memory usage and data transmission efficiency, wherein each of the plurality of icons may be associated with an entity. The operations may comprise providing for display, on the graphical user interface: at least one first tab, wherein each first tab is associated with a vesting class, a plurality of second tabs, wherein each second tab is associated with one of a plurality of lists, a first interactive toggle for setting a transfer authorization, and a second interactive toggle for reconfiguring the plurality of icons based on a specific criterion. The operations may further comprise receiving a data set for a plurality of entities, wherein the data set may include, for each of the plurality of entities, a first entity identifier, an electronic identifier associated with the first entity, or a vesting date associated with the electronic transfer identifier. The method may further comprise determining, for each first entity, the vesting class based on the received data set, generating a directory entry for each first entity, wherein each directory entry is stored in a directory associated with a second entity, storing, in each directory entry, the first entity identifier associated with the first entity, the electronic transfer identifier associated with the first entity, the vesting date associated with the electronic transfer identifier, and the determined vesting class associated with the first entity, receiving, via the first interactive toggle in the graphical user interface, for each electronic transfer identifier, the transfer authorization associated with the electronic transfer identifier, determining, for each electronic transfer identifier, a transfer permission associated with the electronic transfer identifier based on the vesting class and the vesting date, sorting the plurality of first entities into the plurality of lists based on the determined transfer permissions associated with each electronic transfer identifier and the transfer authorizations associated with each electronic transfer identifier, and receiving, via the second interactive toggle in the graphical user interface, a user selection to reconfigure the plurality of icons based on a specific criterion, wherein the specific criterion is the transfer permission, the transfer authorization, and the vesting class. The operations may further include responsive to receiving the user selection to reconfigure the plurality of icons, automatically reconfiguring the plurality of icons on the graphical user interface based on vesting class, wherein each icon is visually displayed in one of the at least one first tabs based on vesting class, automatically reconfiguring the plurality of icons on the graphical user interface based on the plurality of lists, wherein each icon is visually displayed in one of the plurality of second tabs based on the plurality of lists, and displaying, within each icon on the graphical user interface, at least one of the first entity identifier associated with the first entity, the electronic transfer identifier associated with the first entity, the transfer permission associated with the electronic transfer identifier, or the transfer authorization associated with the electronic transfer identifier. Embodiments of the present disclosure may provide a system for reconfiguring a plurality of icons on a graphical user interface to optimize memory usage and data transmission efficiency, wherein each of the plurality of icons may be associated with an entity. The system may comprise a memory storing instructions and at least one processor configured execute the instructions. The instructions may include providing for display, on the graphical user interface: at least one first tab, wherein each first tab is associated with a vesting class, a plurality of second tabs, wherein each second tab is associated with one of a plurality of lists, a first interactive toggle for setting a transfer authorization, and a second interactive toggle for reconfiguring the plurality of icons based on a specific criterion. The instructions may further comprise receiving a data set for a plurality of entities, wherein the data set may include, for each of the plurality of entities, a first entity identifier, an electronic identifier associated with the first entity, or a vesting date associated with the electronic transfer identifier. The method may further comprise determining, for each first entity, the vesting class based on the received data set, generating a directory entry for each first entity, wherein each directory entry is stored in a directory associated with a second entity, storing, in each directory entry, the first entity identifier associated with the first entity, the electronic transfer identifier associated with the first entity, the vesting date associated with the electronic transfer identifier, and the determined vesting class associated with the first entity, receiving, via the first interactive toggle in the graphical user interface, for each electronic transfer identifier, the transfer authorization associated with the electronic transfer identifier, determining, for each electronic transfer identifier, a transfer permission associated with the electronic transfer identifier based on the vesting class and the vesting date, sorting the plurality of first entities into the plurality of lists based on the determined transfer permissions associated with each electronic transfer identifier and the transfer authorizations associated with each electronic transfer identifier, and receiving, via the second interactive toggle in the graphical user interface, a user selection to reconfigure the plurality of icons based on a specific criterion, wherein the specific criterion is the transfer permission, the transfer authorization, and the vesting class. The instructions may further include responsive to receiving the user selection to reconfigure the plurality of icons, automatically reconfiguring the plurality of icons on the graphical user interface based on vesting class, wherein each icon is visually displayed in one of the at least one first tabs based on vesting class, automatically reconfiguring the plurality of icons on the graphical user interface based on the plurality of lists, wherein each icon is visually displayed in one of the plurality of second tabs based on the plurality of lists, and displaying, within each icon on the graphical user interface, at least one of the first entity identifier associated with the first entity, the electronic transfer identifier associated with the first entity, the transfer permission associated with the electronic transfer identifier, or the transfer authorization associated with the electronic transfer identifier.

The systems and methods disclosed herein may be used in various applications and business systems. It is to be understood that the foregoing general description and the following detailed description are exemplary and explanatory only and are not restrictive of the disclosed embodiments.

BRIEF DESCRIPTION OF THE DRAWINGS

The accompanying drawings, which are incorporated in and constitute a part of this specification, illustrate disclosed embodiments and, together with the description, serve to explain the disclosed embodiments.

FIG. 4 presents a flowchart illustrating an exemplary method 400 for reconfiguring a plurality of icons on a graphical user interface to optimize memory usage and data transmission efficiency, wherein each of the plurality of icons may be associated with an entity, consistent with disclosed embodiments.

DETAILED DESCRIPTION

Reference will now be made in detail to exemplary embodiments, discussed with reference to the accompanying drawings. In some instances, the same reference numbers will be used throughout the drawings and the following description to refer to the same or like parts. Unless otherwise stated, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures may be rearranged, combined, or divided without departing from the envisioned embodiments. Similarly, additional steps may be added or steps may be removed without departing from the envisioned embodiments. Thus, the materials, methods, and examples are illustrative only and are not intended to be necessarily limited.

Figure 1:
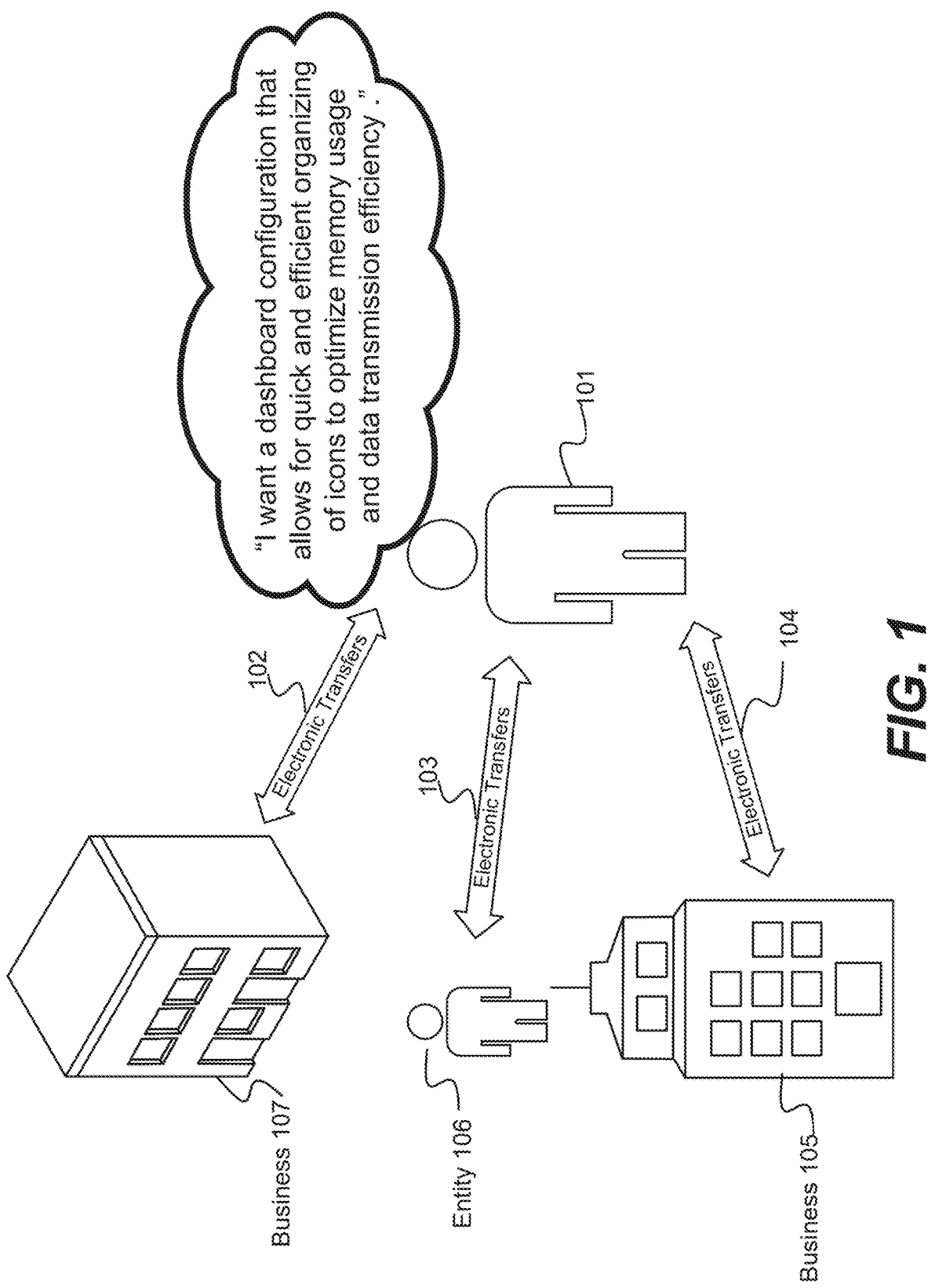
FIG. 1 illustrates an exemplary application of an electronic transfer tracking system, consistent with disclosed embodiments.

FIG. 1 is an illustration of a situation involving a user 101 expressing a desire for a dashboard configuration that allows for quick and efficient organization of icons to optimize memory usage and data transmission efficiency. In this current situation, user 101 needs to individually track electronic transfers between entities. User 101 may include an individual, an organization, or any other entity that may track electronic transfers. For example, user 101 may track electronic transfers associated with a business organization, such as electronic transfers of payments to employees of a business or to shareholders of a company merger. For example, in the current situation, user 101 must schedule and track electronic transfers 102 with business 107, electronic transfers 103 with entity 106, and electronic transfers 104 with business 105. Entity 106 may include an individual, such as an employee or a shareholder of a company. Business 107 may include an organization or a company. Although FIG. 1 depicts three electronic transfers 102, 103, and 104, these are merely exemplary, and user 101 may schedule and track hundreds of electronic transfers each day. User 101 must use voluminous amounts of data to track and schedule electronic transfers 102, 103, 104 because the status of the electronic transfers 102, 103, 104 may change in real time and user 101 may schedule and track hundreds of electronic transfers simultaneously. Because of the voluminous amounts of data associated with electronic transfers, such as electronic transfers 102, 103, 104, it may be difficult for user 101 to organize, schedule, and track electronic transfers 102, 103, 104.

Figure 2:
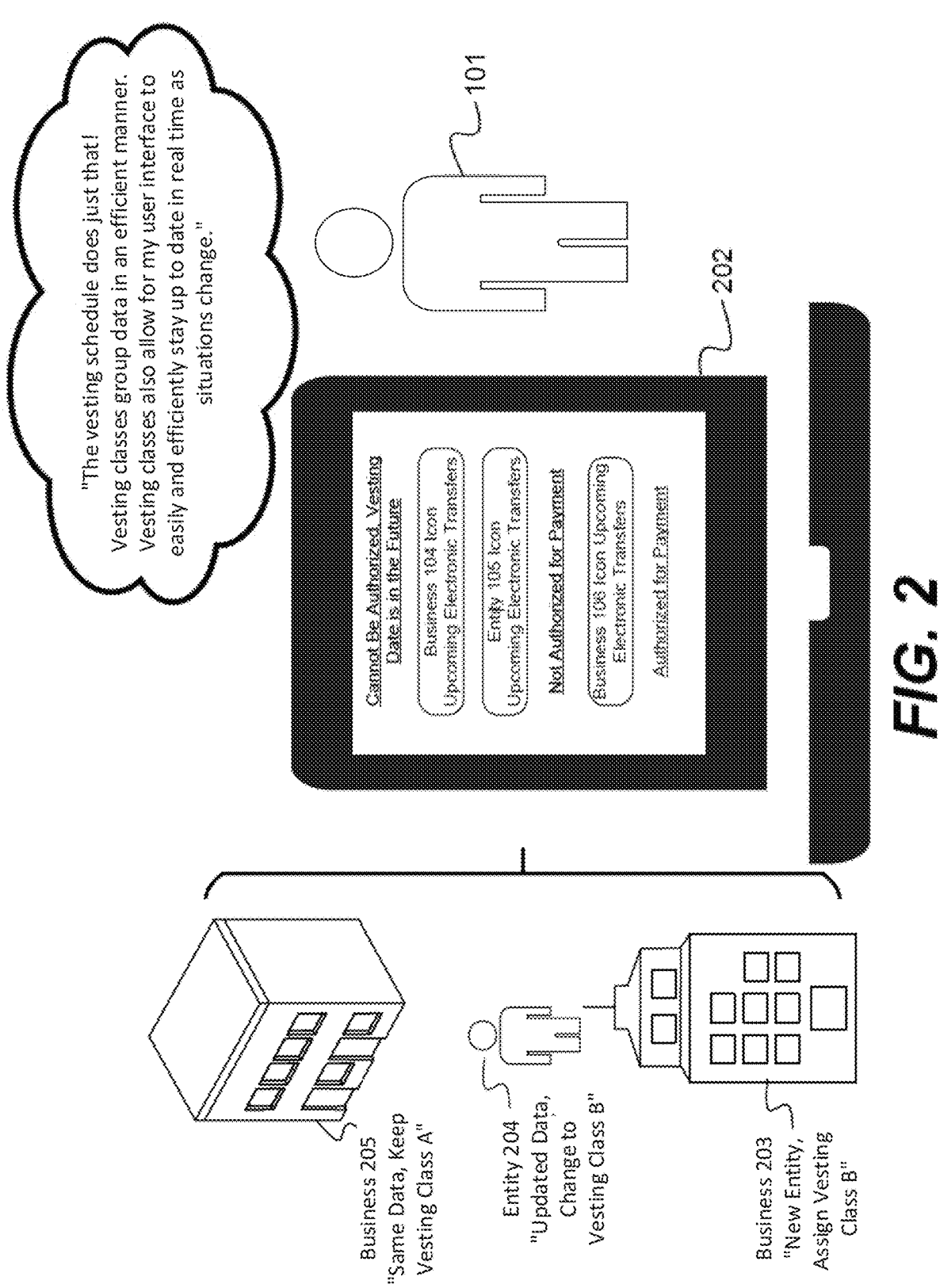
FIG. 2 illustrates another exemplary application of the electronic transfer tracking system to automatically translate the electronic transfers between entities to a graphical user interface, consistent with disclosed embodiments.

FIG. 2 is an illustration of a situation involving the user 101 expressing a satisfied experience based on a web-based application 202 providing an organized vesting schedule. A vesting schedule may comprise a timeline to track and schedule when a business or an entity may receive an electronic transfer from user 101. The web-based application 202 may provide vesting classes that may group data in an efficient manner and may provide up-to-date information in real time as situations change. Vesting classes may divide entities and businesses into different categories based on the status of each entity or business with user 101. For example, web-based application 202 may include a business 104 icon, an entity 105 icon, and a business 106 icon that may represent authorized and unauthorized transactions. The business 104 icon, entity 105 icon, and business 106 icon may be organized based on the real-time status of the vesting classes of each group. The organization of icons on web-based application 202 may be updated in real-time to reflect up-to-date information about transactions between business 205, entity 204, and business 203. For example, web-based application 202 may reflect that the status of business 205 has the same data and business 205 should be kept in vesting class A. Web-based application 202 may reflect updated data from entity 204 and that entity 204 should be changed to vesting class B. Web-based application 202 may reflect that business 203 is a new entity and should be assigned to vesting class B.

System, Processor, Memory, Network, and User Interface

Figure 3A:
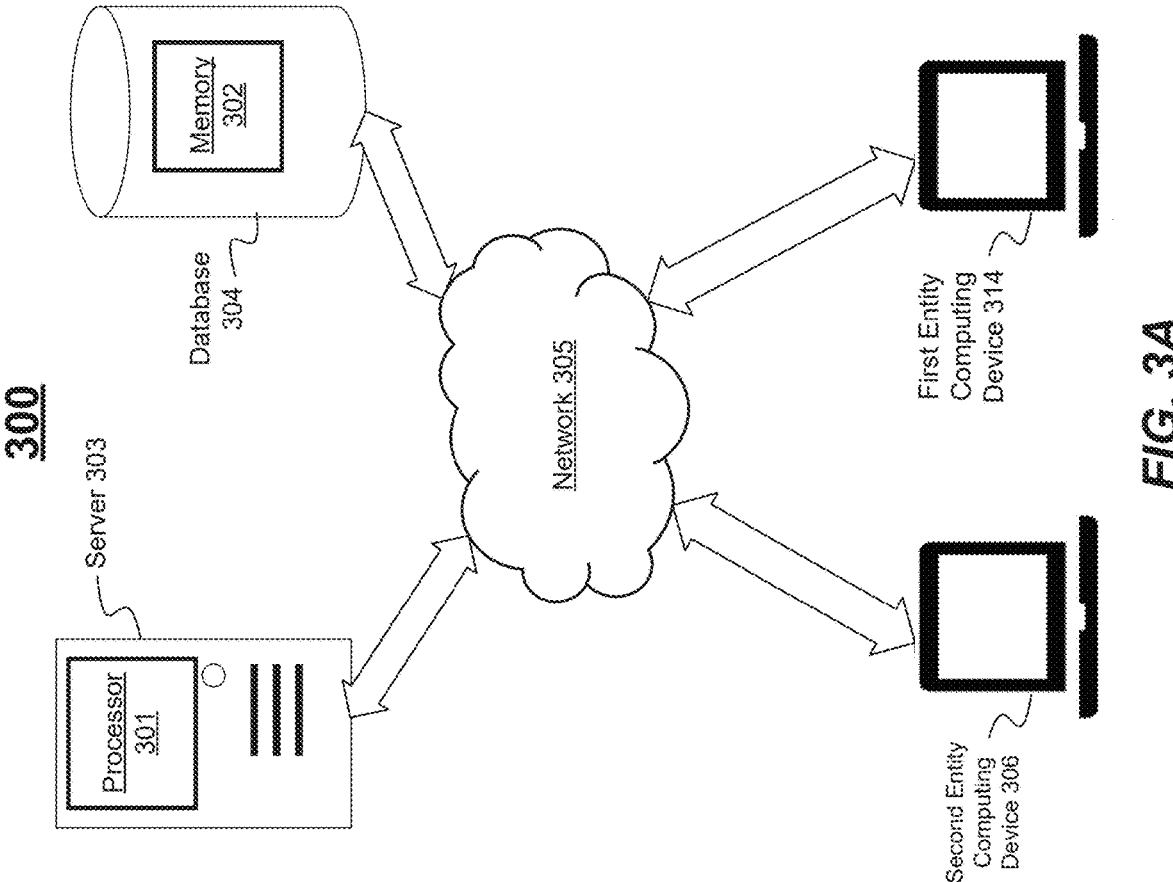
FIG. 3A illustrates an exemplary electronic transfer scheduling and vesting status tracking system 300, consistent with disclosed embodiments.

FIG. 3A illustrates an exemplary electronic transfer scheduling and vesting status tracking system 300, consistent with disclosed embodiments. As shown in FIG. 3A, system 300 may include a server 303, which may include at least one processor 301. System 300 may also include a database 304, which may include at least one memory 302. System 300 may also include a network 305, a second entity computing device 306, and a first entity computing device 314. In system 300, server 303 and database 304 may communicate with each other via network 305, server 303 and second entity computing device 306 may communicate with each other over network 305, and second entity computing device 306 and database 304 may communicate with each other over network 305. Further, first entity computing device 314 may communicate bidirectionally with second entity device 306, server 303, and database 304 over network 305.

Figure 3B:
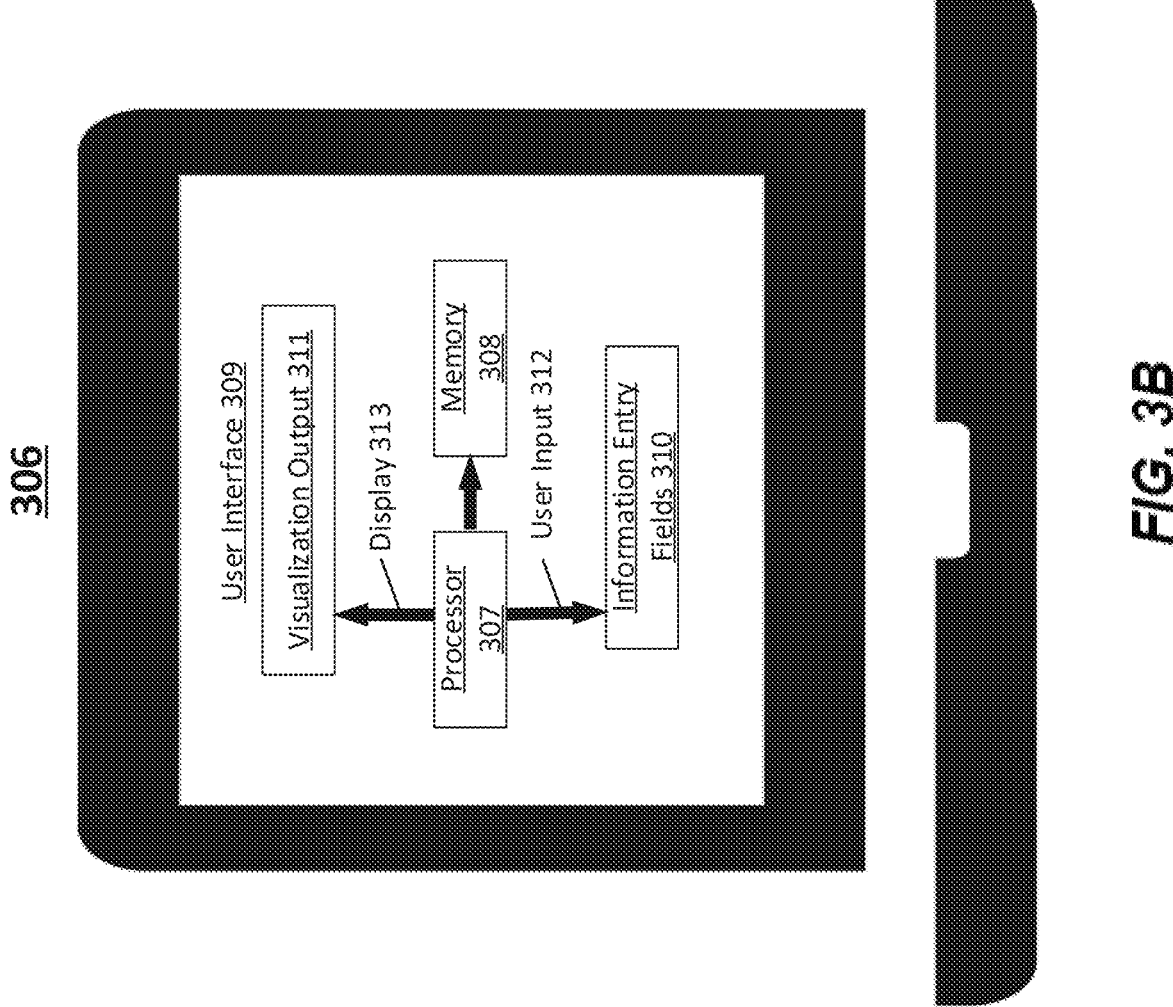
FIG. 3B illustrates an exemplary entity computing device, consistent with disclosed embodiments.

FIG. 3B illustrates an exemplary second entity computing device 306 and/or first entity computing device 314, consistent with disclosed embodiments. In some embodiments, a first entity computing device 314 may have the similar configuration, components, or features as the second entity computing device 306 depicted in FIG. 3B. Collectively, the second entity computing device 306 and first entity computing device 314 may be referred to as entity computing device 306, 314 when their similar configuration, components, and features are being described. As shown in FIG. 3B, entity computing device 306, 314 may include at least one processor, like processor 307, for example. Entity computing device 306, 314 may also include memory 308, and processor 307 may be connected to memory 308. Entity computing device 306 and/or 314 may also include user interface 309, and processor 307 may control the appearance of user interface 309. User interface 309 may include information entry fields 310 for receiving user input 312. Processor 307 may receive user inputs 312 from user interface 309. These inputs may include, for example, an entity's indication to authorize an electronic transfer. User interface 309 may also contain a visualization output 311. Processor 307 may communicate display 313 to user interface 309 for display on visualization output 311.

Consistent with disclosed embodiments, "at least one processor" discussed herein and illustrated in the figures (e.g., 301 and/or 307) may constitute any physical device or group of devices having electric circuitry that performs a logic operation on an input or inputs. For example, the at least one processor 301 and/or 307 may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. In some embodiments, the at least one processor (e.g., 301 and/or 307) may include more than one processor. Each processor (e.g., 301 and/or 307) may have a similar construction or the processors (e.g., 301 and/or 307) may be of differing constructions that are electrically connected or disconnected from each other. For example, the processors (e.g., 301 and/or 307) may be separate circuits or integrated in a single circuit. When more than one processor (e.g., 301 and/or 307) is used, the processors (e.g., 301 and/or 307) may be configured to operate independently or collaboratively, and may be co-located or located remotely from each other. The processors (e.g., 301 and/or 307) may be coupled electrically, magnetically, optically, acoustically, mechanically or by other means that permit them to interact.

The instructions executed by at least one processor (e.g., 301 and/or 307) may, for example, be pre-loaded into a memory (e.g., 302 and/or 308), integrated with or embedded into the controller or may be stored in a separate memory. Memory (e.g., 302 and/or 308) may include a Random Access Memory (RAM), a Read-Only Memory (ROM), a hard disk, an optical disk, a magnetic medium, a flash memory, other permanent, fixed, or volatile memory, or any other mechanism capable of storing instructions. As used herein, a memory (e.g., 302 and/or 308), refers to any type of physical memory on which information or data readable by at least one processor may be stored. Examples of memory include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same.

A server, such as server 303 may be in communication with network 305. Server 303 may manage the various components in system 300. In some embodiments, server 303 may be configured to process and manage requests between second entity computing device 306, first entity computing device 314, and/or databases 304. Server 303 may participate in reconfiguring a plurality of icons on a graphical user interface to optimize memory usage and data transmission efficiency, as disclosed herein.

The terms "memory" (e.g., 302 and/or 308) and "computer-readable storage medium" may refer to multiple structures, such as a plurality of memories or computer-readable storage mediums located within an input unit or at a remote location. Additionally, one or more computer-readable storage mediums may be utilized in implementing a computer-implemented method. The memory (e.g., 302 and/or 308) may include one or more separate storage devices collocated or disbursed, capable of storing data structures, instructions, or any other data. The memory (e.g., 302 and/or 308) may further include a memory portion containing instructions for the processor to execute. The memory (e.g., 302 and/or 308) may also be used as a working scratch pad for the processors (e.g., 301 and/or 307) or as a temporary storage. Accordingly, the term computer-readable storage medium should be understood to include tangible items and exclude carrier waves and transient signals.

Some embodiments may involve displaying information on a graphical user interface (e.g., 309), as shown in FIG. 3B. A user interface (e.g., 309) may be part of a computing device (e.g., 306, 314) that has inputs and outputs. Accordingly, an entity computing device (e.g., 306, 314) may be a device that has the functionality necessary to realize a user interface 309, for example, a mobile device, desktop, laptop, tablet, or any other devices capable of displaying, receiving, and processing data. Such an entity computing device (e.g., 306, 314) may also include a display such as an LED display, augmented reality (AR), or virtual reality (VR) display.

User interface (e.g., 309) may contain information entry fields 310 for receiving an entity's user input 312. Information entry fields 310 may provide different means for an entity using the user interface 309 to enter information that is eventually received by a processor (e.g., 301 and/or 307). By way of example, the information entry fields 310 may include a link, a button element, a drop-down menu, or an empty field for the user, or entity, to type in. A user input 312 may be any information the entity using the user interface 309 wants to enter. In some embodiments, this user input 312 may include an entity's indication to authorize an electronic transfer, which may involve making a selection, from, for example, a drop-down menu in the information entry field 310. In some embodiments, the user input 312 may include an indication by a second entity to add a new first entity to a directory. For example, a directory may include a linked list, look up table, database record, or other similar data structures that may store nodes of data elements associated with a plurality of first entities. A user input 312 may include an addition of a new first entity in the directory by, for example, entering information related to the first entity in an empty field in the information entry field 310.

User interface 309 may also contain a visualization output 311. Processor 301 and/or 307 may communicate display 313 to user interface 309 for display on visualization output 311. A visualization output 311 may be any kind of display screen that may visually display information to an entity. For example, a visualization output may be rendered on a mobile phone screen, a laptop computer screen, or a desktop computer screen. Display 313 may comprise the data that is displayed on visualization output 311. For example, display 313 may include a list of icons representing a plurality of entities and their upcoming electronic transfers, as described with respect to FIG. 2.

Consistent with the present disclosure, disclosed embodiments may involve a network (e.g., 305). A network (e.g., 305) may constitute any type of physical or wireless computer networking arrangement used to exchange data between, for example, entity computing device 306, server 303, and/or database 304. For example, a network (e.g., 305) may be the Internet, a private data network, a virtual private network using a public network, a Wi-Fi network, a LAN or WAN network, a combination of one or more of the foregoing, and/or other suitable connections that may enable information exchange among various components of the system (e.g., 300). In some embodiments, a network (e.g., 305) may include one or more physical links used to exchange data, such as Ethernet, coaxial cables, twisted pair cables, fiber optics, or any other suitable physical medium for exchanging data. A network (e.g., 305) may also include a public switched telephone network ("PSTN") and/or a wireless cellular network. A network (e.g., 305) may be a secured network or unsecured network. In other embodiments, one or more components of the system (e.g., 300) may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between for example, entity computing device 306, 314, server 303, and/or database 304.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system (e.g., 300, a component of memory 302 and/or 308) or a remote computing component (e.g., a cloud-based data structure). Data in the data structure may be stored in contiguous or non-contiguous memory. Moreover, a data structure, as used herein, does not require information to be co-located. It may be distributed across multiple servers (e.g., 303), for example, that may be owned or operated by the same or different entities. Thus, the term "data structure" as used herein in the singular is inclusive of plural data structures.

Certain embodiments disclosed herein may include a processor (e.g., 301 and/or 307) configured to perform methods that may include triggering an action in response to an input. The input may be from a user action, for example, a user input 312 in information entry fields 310. A trigger may include an input of a data item that is recognized by at least one processor (e.g., 301 and/or 307) that brings about another action.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor (e.g., 301 and/or 307). It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor (e.g., 301 and/or 307), cause the at least one processor (e.g., 301 and/or

307) to perform a method. Non-transitory computer readable mediums may be any medium capable of storing data in any memory (e.g., 302 and/or 308) in a way that may be read by any computing device with a processor (e.g., 301 and/or 307) to carry out methods or any other instructions stored in the memory (e.g., 302 and/or 308). The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs") (e.g., 301 and/or 307), a memory (e.g., 302 and/or 308), and input/output interfaces (e.g., 309, 310, and/or 311). The computer platform may also include an operating system and microinstruction code. The various processes and functions described in this disclosure may be either part of the microinstruction code or part of the application program, or any combination thereof, which may be executed by a CPU, whether or not such a computer or processor (e.g., 301 and/or 307) is explicitly shown. In addition, various other peripheral units may be connected to the computer platform such as an additional data storage unit and a printing unit. Furthermore, a non-transitory computer readable medium may be any computer readable medium except for a transitory propagating signal.

Processor 301 and/or 307 may run computer applications. Applications may be mobile computer programs configured to run on mobile phones or tablet computers. Applications may also be computer programs configured to run on laptop computers or desktop computers. Computer applications are computer software packages designed to carry out specific tasks. Some applications may be front end applications that interact directly with a computer or mobile device user. Processor 307 may be included in entity computing device 306 and/or 314 and may, for example, run front end applications. Back-end applications may be applications that support the front end applications and interact with the front end applications. A front-end application may call the back-end application to process data or to retrieve or access data. Processor 301 included in server 303 may, for example, run back-end applications.

Embodiments described herein may refer to methods that include various steps. Unless the order is characterized as necessary, the steps of methods described herein may be performed in any order possible to achieve the results of the method.

Electronic Transfer Graphical User Interface Optimization

FIG. 4 presents a flowchart illustrating an exemplary method 400 for reconfiguring a plurality of icons on a graphical user interface to optimize memory usage and data transmission efficiency, wherein each of the plurality of icons may be associated with an entity. Method 400 may be used to optimize tracking of electronic transfers by updating or rearranging icons on a graphical user interface. Memory usage may be decreased and the processing demands on a computer processor may be reduced by determining vesting classes. Vesting classes may refer to groups into which an entity (e.g., company or organization) may separate its employees based on their status with the entity. For example, an entity may separate its employees into vesting classes such as "scheduled," "accelerated," and "terminated." A "scheduled" vesting class may be a default value assigned to employees. An "accelerated" vesting class may be used if an employee is entitled to an electronic transfer ahead of a scheduled vesting date. A "terminated" vesting class may be used if an employee is no longer entitled to a transfer from the entity. This may be useful to entities and their employees because vesting classes may consolidate the process of tracking and initiating electronic transfers to employees of the entity. In some embodiments, the vesting classes may be centrally stored in a directory. In some embodiments, the electronic transfer may be a payment, and therefore, method 400 may be used by the entity to track and arrange payment disbursements to employees. In other embodiments, the electronic transfer may be a transfer of electronic files (e.g., one or more documents or other electronic files associated with an individual). In these embodiments, method 400 may be used, for example, by the entity to track and arrange the transfer of electronic files to employees. For example, an entity may use method 400 to transfer electronic files or documents to a plurality of employees based on the vesting classes of the employees.

Method 400 may include a step 401 of providing for display, on the graphical user interface, at least one first tab, wherein each first tab is associated with a vesting class, a plurality of second tabs, wherein each second tab is associated with one of a plurality of lists, a first interactive toggle for setting a transfer authorization, and a second interactive toggle for reconfiguring the plurality of icons based on a specific criterion. The vesting class, plurality of lists, transfer authorization, the plurality of icons, and the reconfiguring of the plurality of icons will be technically described in detail below as method 400 is described.

In some embodiments, the first interactive toggle and the second interactive toggle may be buttons included in information entry fields 310 that may be used by an entity to input information for assessment by processor 301 and/or 307. A tab, such as the at least one first tab and the plurality of second tabs, may be a clickable or selectable area in a graphical user interface that shows another page or area. A tab may be a graphical user interface object that allows multiple icons, documents, or panels to be contained within that tab (e.g., within that single page or area). Tabs may be used as navigational widgets for switching between pages, lists, documents, or groups of information in a graphical user interface.

The graphical user interface may display icons, for example, a plurality of icons. An icon may be a pictogram or ideogram displayed on a graphical user interface and may help a user navigate the graphical user interface. An icon may be a quickly comprehensible symbol of a data file, software tool, or function, accessible by the processor 301 and/or 307. An icon may serve as an electronic hyperlink or file shortcut to access data. A user may activate an icon using, for example, a mouse, pointer, finger, or voice command, among other options. An icon's placement on the graphical user interface may provide further information about the icon's usage or associations with relevant data. In activating an icon, a user may move directly into and out of the identified data or function without knowing anything further about the location or requirements of the data file or code. The plurality of icons may be generated by processor 301 and/or 307 by accessing data stored in a directory of data stored in memory 302 and/or 308, like, for example, the directory generated in step 405 below. By way of example, each icon may be generated by processor 301 and/or 307 by accessing data stored in a directory entry (e.g., a directory entry generated in step 405) in memory 302 and/or 308 and formatting the data for visual representation on visualization output 311.

Icons may be arranged into tabs, so that a certain set of icons is displayed on the graphical user interface when a given tab is selected. Thus, different tabs may display the same set of icons or different sets of icons. In some embodiments, at least some of the icons on a pair of different tabs may be the same, whereas other icons on the pair of tabs may be different. Icons may be visual representations of first entities and their upcoming electronic transfers displayed on visualization output 311 on user interface 309. Each icon may display information for a specific first entity and their upcoming electronic transfers. For example, there may be one icon for each first entity currently employed by a second entity or for each first entity that presently has upcoming electronic transfers arranged with the second entity. In this embodiment, each icon may display the entity identifier of the first entity (e.g., name of the employee), the first entity's vesting class, the upcoming electronic transfer for that first entity (completed and/or uncompleted), the vesting dates for the upcoming electronic transfer, the transfer authorization for upcoming electronic transfer, and the transfer permission for the upcoming electronic transfer. In some embodiments, some icons may indicate that an upcoming electronic transfer cannot yet be authorized because it is not eligible due to the vesting date being in the future. In such embodiments, the electronic transfer may become eligible for authorization once the vesting date is the present day or in the past, or if the vesting class is switched to accelerated. In some embodiments, icons may indicate that an electronic transfer that may be eligible for authorization but has not been authorized yet. In some embodiments, the icons may be changed, for example, by reconfiguring or recoloring the icons, when a status of the electronic transfer changes based on, for example, the arrival of the vesting date, a change in vesting class, an authorization of the electronic transfer, or any other factor that may affect the status of the electronic transfer.

Method 400 may include a step 402 of receiving a data set for a plurality of first entities, wherein the data set includes, for each of the plurality of first entities, at least one of: a first entity identifier, an electronic transfer identifier associated with the first entity, or a vesting date associated with the electronic transfer identifier.

The first entities may be transferee entities, which may be entities that are employed by a second entity. The second entity may be a transferor entity, like an employer that may electronically transfer files or electronic payments to the first entities. First entities may also be payees or transferees, meaning that the first entity may be associated with an electronic repository that receives an electronic transfer, like a payment. For example, the first entity may own a bank account that may receive a payment from the second entity. The second entity may be a company, a business, a person, a non-profit, or other similar individuals or organizations.

An entity identifier may be a string of letters and/or numbers that uniquely identifies an entity, such as the name of a first entity or a second entity, an identification number, a username, or any other combination of letters and numbers that is uniquely associated with the entity. A vesting date may be a predetermined date on or after which an electronic transfer between an entity repository owned by the second entity and an entity repository owned by the first entity may be completed. A vesting date may be selected by the second entity by inputting a date into information entry fields 310 in user interface 309. An electronic transfer identifier may be a string of letters and/or numbers that uniquely identifies an electronic transfer. In some embodiments, an electronic transfer may be a transfer of electronic files from the second entity to the first entity. In some embodiments, the electronic transfer may be an electronic transfer of funds, such as a payment.

A data set may be a group of data elements stored in a manner that the data elements may be organized and associated with each other. For example, these data elements may include entities' identifiers, vesting dates, and electronic transfer identifiers. For any given entity, these data elements may be associated with each other in memory 302 and/or 308. The data elements for a plurality of first entities may be complied into an overall data set stored in memory 302 and/or 308. The data elements that may make up the data set may be associated using any means for associating data. Some examples of associating data may include using a linked list, a look up table, or by storing the first entity information in the same database record, or by using other similar methods. A linked list may consist of nodes stored in memory 302 and/or 308. A node may comprise a basic unit in a data structure, such as a linked list, and each node may contain a data field and a reference to the next node in the list. For example, a first entity's group of data elements may be associated with each other in the linked list, and the node storing the data of the first entity may further include a reference to a location in memory 302 and/or 308 storing the data elements of another first entity, and so on with however many first entities the second entity may desire to have in their directory. A look up table may be an array of data in memory 302 and/or 308 that may map input values to output values. Given a set of input values, the at least one processor may query a look up table to retrieve the corresponding output values from the table. For example, if a look up table mapped a first entity identifier to a location in memory 302 and/or 308 storing the data elements for that first entity and their upcoming electronic transfer, then by inputting that first entity identifier, processor 301 and/or 307 may access and retrieve the data elements associated with that first entity and their upcoming electronic transfer as an output for use in process 400. As another example, a database record may be a collection of information organized in a table that pertains to a specific topic or category.

Processor 301 and/or 307 may receive each of the vesting class, vesting date, entity identifier, and transfer authorization from either the second entity computing device 306 or the first entity computing device 314, or a combination of the two, over network 305. Processor 301 and/or 307 may then store this data set in memory 302 and/or 307. Processor 301 and/or 307 may then subsequently access this data in memory 302 and/or 307 to track upcoming electronic transfers and update user interface 309 accordingly by transmitting updated data sets and/or displays to processor 301 and/or 307 located at entity computing device 306 and/or 314 and displaying updated information on visualization output 311. This data may be associated with each other in memory 302 and/or 308 when received by processor 301 and/or 307, and the techniques used to associate this data will be explained further below in this disclosure.

In some embodiments, the data set for the plurality of entities may further comprise a repository status or repository type. A repository type may further define what kind of repository the entity repository is, for example, a bank account, a checking account, a savings account, or an electronic file folder. A repository status may relate to whether the entity that owns the repository is actively open and being used by a legitimate entity. A repository status may be determined through any known account verification processes, such as a Know Your Customer procedure, Anti-Money Laundering procedure, bank account verification procedure, or any other processes for verifying the legitimacy of a repository. For example, the repository status may relate to whether the entity repository has made or received electronic transfers in the past few weeks, or whether the entity repository is associated with a legitimate, verifiable, first entity or second entity. The repository status may also indicate whether the entity repository is associated with a legitimate current address, or social security number.

Method 400 may include a step 403 of determining a vesting class for each entity based on the received data set. In some embodiments, a vesting class may categorize entities based on their status within a second entity, for example, as an employee or a shareholder. Each first entity may be assigned a vesting class. In some embodiments, the vesting class may be one of default, accelerated, or terminated. A default vesting class may be a standard value assigned to new first entities. If a vesting electronic transfer is set up as "default," method 400 may take into account the vesting date to see if an electronic transfer is eligible for authorization. The "accelerated" class may be used if the vesting date should no longer be a factor on if/when a participant's vesting electronic transfer may be authorized or completed. The "terminated" class may be used if an entity is no longer entitled to a transfer from the second entity. For example, the terminated class may be used if an employee is no longer with the company second entity. The terminated class may allow for the electronic transfers to still be tracked without initiating or completing the electronic transfer. In some embodiments, vesting classes may be updated at any time, including in real-time, as long as the electronic transfer is not completed. In some embodiments, if an uncompleted electronic transfer is authorized and a change to the electronic transfer contents is made, the amount may need to be reauthorized.

The steps of method 400 may be performed by at least one processor, such as processor 301 and/or 307. In some embodiments, at least one processor (such as 301 and/or 307) may determine the vesting class for each first entity. In some embodiments, the vesting class may be set to default for a given first entity who is currently employed at the second entity and who does not fall into any other bucket (e.g., accelerated vesting class, terminated vesting class). For example, processor 301 and/or 307 may determine a new first entity's initial vesting class is default when the new first entity joins the second entity for the first time. Processor 301 and/or 307 may determine that a first entity's vesting class is terminated automatically upon receiving an indication that the first entity is no longer employed with the second entity. Processor 301 and/or 307 may determine that a first entity's vesting class is accelerated based on the data set determined in step 402.

Method 400 may include a step 404 of generating a directory entry for each first entity, wherein each directory entry may be stored in a directory associated with a second entity. A directory entry may be a group of data associated with a given first entity. For example, a directory entry may be a node in a linked list, where the linked list stores one node for each first entity. Each node in the linked list may store the data elements associated with the given first entity in memory 302 and/or 308. A directory associated with the second entity may be a linked list, look up table, database record, or other similar data structure that stores all of the nodes of data elements for all of the first entities. In some embodiments, this directory associated with the second entity may be a directory storing data for all the first entity employees employed at a secondary entity business. Processor 301 and/or 307 may generate additional directory entries by, for example, generating new nodes in the linked list directory associated with the second entity. These new directory entries may be for new first entities for whom data is received for the first time.

Method 400 may include a step 405 of storing, in each directory entry, the first entity identifier associated with the first entity, the electronic transfer identifier associated with the first entity, the vesting date associated with the electronic transfer identifier, and the determined vesting class associated with the first entity. Step 405 may be achieved by processor 301 and/or 307 storing each data element in the appropriate location in the data structure stored in memory 302 and/or 308, representing the directory associated with the second entity. For example, in some embodiments, step 405 may be achieved by processor 301 and/or 307 storing each data element in the data field of the linked list node associated with the appropriate given first entity in memory 302 and/or 308.

Method 400 may include a step 406 of receiving, via the first interactive toggle in the graphical user interface, for each electronic transfer identifier, the transfer authorization associated with the electronic transfer identifier. A transfer authorization may be an indication from the second entity that they approve of the upcoming electronic transfer associated with a first entity and that the upcoming electronic transfer may be initiated and completed. In some embodiments, an authorization button may be the first interactive toggle included in information entry fields 310 if the electronic transfer is eligible for authorization and the second entity has proper funds to complete the electronic transfer. An electronic transfer may be eligible for authorization if the transfer authorization is currently set to "not authorized" and if the vesting date is the present day or in the past. An electronic transfer may also be eligible for authorization if the vesting class is set to accelerated and if the transfer authorization is set to "not authorized," regardless of the current date. A vesting electronic transfer may be eligible to be completed if the vesting date is in the past, or if the vesting date equals accelerated, and if the transfer authorization is set to "authorized."

In some embodiments, if a second entity has the ability to view but not to authorize the electronic transfers, then an authorize button may be hidden from the second entity. In some embodiments, hidden may mean that the authorize button is not presented in information entry fields 310 on the graphical user interface. In other embodiments, the authorize button may be presented in information entry fields, but may not be activatable by the second entity. After the transfer authorization indication is input by the second entity, processor 301 and/or 307 may store this transfer authorization indication in memory 302 and/or 308 for later use.

In some embodiments, electronic transfers may occur between a first entity repository associated with the first entity and a second entity repository associated with the second entity. In some embodiments, the first entity's repository and the second entity's repository may be electronic accounts that are maintained by an institution such as a bank, and the electronic transfer may be an electronic payment from the second entity to the first entity. In some embodiments where the second entity makes recurring payments to the first entity, the second entity may set recurring vesting dates for recurring payments on a recurring basis.

In some embodiments, the first interactive toggle may indicate a transfer authorization at at least one of the following levels: a vesting class level, an amount level, or a date level. A transfer authorization applied at a level may mean that all electronic transfers meeting that criteria may receive a transfer authorization, all through the single indication of a transfer authorization. A vesting class level may mean that all electronic transfers with an electronic transfer identifier associated with a first entity having a certain vesting class may be authorized with the single authorization indication. An amount level means that all electronic transfers over a certain amount, under a certain amount, or at a certain amount may be authorized with the single authorization indication. A date level means that all electronic transfers scheduled for, before, during, or after a certain date may be authorized with the single authorization indication.

Method 400 may include a step 407 of determining, for each electronic transfer identifier, a transfer permission associated with the electronic transfer identifier based on the vesting class and the vesting date. A transfer permission may be an indication generated by processor 301 and/or 307 that an upcoming electronic transfer may be eligible to be authorized, initiated, and completed. For example, a transfer permission may illustrate that all requisite vesting variables have been satisfied from both the second entity and the first entity so that it is appropriate to complete the upcoming electronic transfer when authorized by the second entity. The transfer permissions may need to be categorized as eligible to indicate that the first entity is permitted to receive an electronic transfer based on the vesting class, the vesting date, or any other vesting variables. The transfer permission may also need to be authorized for an electronic transfer to be initiated and completed. Authorizing an electronic transfer may indicate that the second entity has approved the electronic transfer that the first entity is eligible to receive. Completing an electronic transfer may involve a transfer of electronic contents from one entity repository to another. For example, completing an electronic transfer may involve a transfer of electronic funds from a bank account owned by the second entity to a bank account owned by the first entity when the second entity is making a payment to a given first entity employee.

The transfer permission may be determined by processor 301 and/or 307 setting a variable in memory 302 and/or 308 to "permitted" if the vesting class is accelerated. In some embodiments, the transfer permission may be determined by processor 301 and/or 307 setting a variable in memory 302 and/or 308 to "permitted" if the vesting class is default and if the vesting date is not in the future. In some embodiments, the variable may be set to a number, letter, or symbol that may represent that the vesting class is "permitted." In some embodiments, the transfer permission may be determined by processor 301 and/or 307 setting a variable in memory 302 and/or 308 to "not permitted" if the vesting class is default and if the vesting date is in the future. In some embodiments, the transfer permission may be determined by setting a variable in memory to "not permitted" is the vesting class is terminated. In some embodiments, the variable may be set to a number, letter, or symbol that may represent that the vesting class is "not permitted."

In some embodiments, processor 301 and/or 307 may determine that the transfer permission is "permitted" as soon as vesting class and vesting date requirements are satisfied, consistent with disclosed embodiments. In some embodiments, additional considerations may be taken into account when processor 301 and/or 307 determines the transfer permission of an electronic transfer. For example, in some embodiments, processor 301 and/or 307 may delay setting the transfer permission to "permitted" to a date and time after the vesting date has passed. By way of example, this may occur when the first entity's vesting class is set to default and the second entity authorizes the electronic transfer on the same day. This may be because when a first entity's vesting class is default, the electronic transfer may not become eligible for authorization until the vesting date is reached. In these situations, the electronic transfer may be completed on the vesting date. However, in some embodiments, the transfer permission may not be set to "permitted" until sometime after the vesting date if the electronic transfer has not been authorized.

Method 400 may include a step 408 of sorting the plurality of first entities into a plurality of lists based on the determined transfer permissions associated with each electronic transfer identifier and the transfer authorizations associated with each electronic transfer identifier. Each list of the plurality of lists may represent a category. For example, in some embodiments a list may be created for each combination of transfer authorization and transfer permission. These lists may be data structures in memory 302 and/or 308 consistent with embodiments described herein. These lists may be created by processor 301 and/or 307 associating entities and their electronic transfer identifiers based on their transfer permissions and transfer authorizations. For example, processor 301 and/or 307 may query memory 302 and/or 308 for each electronic transfer identifier having a transfer authorization set to authorized and a transfer permission set to permitted, and then retrieve a pointer to a location in memory 302 and/or 308 of each external profile having these specified criteria. Processor 301 and/or 307 may then generate a list of pointers pointing to the locations in memory of each electronic transfer identifier having these specified criteria. This generated list of memory pointers may be stored by processor 301 and/or 307 in memory 302 and/or 308. A similar list may be generated by processor 301 and/or 307 for electronic transfer identifiers having a transfer authorization set to authorized and a transfer permission set to not permitted, and for electronic transfer identifiers having a transfer authorization set to not authorized and a transfer permission set to not permitted. Processor 301 and/or 307 may query memory 302 and/or 308 for each electronic transfer identifier having any of these combinations of specified criteria because each first entity directory entry may store in memory 302 and/or 308 the transfer permissions and transfer authorizations associated with each electronic transfer identifier associated with that first entity. This value may be determined and stored, for example, according to techniques referenced in steps 207 and 208 of method 400 by processor 301 and/or 307. After processor 301 and/or 307 determines transfer authorization and transfer permission of an electronic transfer identifier, processor 301 and/or 307 may store a value in the relevant first entity's directory entry in memory 302 and/or 308 reflecting those determined variables.

Step 408 may re-sort these lists of external profiles based on the transfer authorization and transfer permission criteria at any time a new transfer authorization or transfer permission is determined. Lists may need to be re-sorted after a first entity's vesting class changes. The lists may be rearranged by processor 301 and/or 307 accessing the lists in memory 302 and/or 308 and moving memory pointers into the new correct lists. By way of example, consider the situation where a business second entity wishes to view all the employee first entities stored in its directory so that it may evaluate which electronic transfers it may permit. Assume, for the purposes of this example, three lists exist in memory 302 and/or 308, a list of electronic transfer identifiers having a transfer authorization set to authorized and a transfer permission set to permitted, a list of electronic transfer identifiers having a transfer authorization set to authorized and a transfer permission set to not permitted, and a list of electronic transfer identifiers having a transfer authorization set to not authorized and a transfer permission set to not permitted. Further assume that a specific electronic transfer identifier may be associated with a first entity having a vesting class set to accelerated in memory 302 and/or 308, consistent with techniques described herein. Further assume that one week ago processor 301 and/or 307 determined a given employee first entity associated with an electronic transfer identifier has a vesting class set to accelerated due to the original historical data, and accordingly processor 301 and/or 307 stored a pointer pointing to the location in memory 302 and/or 308 the electronic transfer identifier. This may be the list of electronic transfer identifiers having a transfer authorization set to authorized and a transfer permission set to not permitted, and processor 301 and/or 307 may store this list in memory 302 and/or 308. Now assume that one week later, processor 301 and/or 307 determines that a given employee first entity's vesting class is default based on updated historical data. Processor 301 and/or 307 may update the value indicating vesting class in the given employee first entity's directory entry in memory 302 and/or 308. As previously described, the transfer authorization variable may be dependent on the determined vesting class. Processor 301 and/or 307 may also automatically move the memory pointer pointing to the location in memory 302 and/or 308 of the electronic transfer identifiers associated with that given employee first entity into the list of electronic transfer identifiers having a transfer authorization set to not authorized and a transfer permission set to not permitted. Accordingly, the list's electronic transfer identifiers may be automatically rearranged by swapping memory location pointers between the lists when transfer authorizations and transfer permission are redetermined.

These transfer authorizations and transfer permissions may be re-determined at any given time. For example, a second entity user may wish to refresh its user interface to show where employee first entities and their associated upcoming electronic transfers stand in terms of transfer authorization, transfer permission, and vesting class in preparation for making electronic payments to employee first entities. In such a case, a second entity user may enter a user selection to reorganize via a refresh button that may be included in entry fields 310 of user interface 309, and therefore automatically rearrange the icons based on any updated transfer authorizations or transfer permissions. By way of example, if the first entity repositories were bank accounts storing electronic funds, and if the first entities were employees, then the second entity may have a directory listing directory entries for these employee first entities. These directory entries may be related to bank accounts held by employee first entities. The business second entity may wish to check up on the status of employee entities when deciding what electronic transfers it should make and when it should make them. As a solution, the second entity may want to redetermine the vesting classes, transfer authorizations, and/or transfer permissions of the employee first entities and their associated electronic transfer identifiers for convenient viewing.

Method 400 may include a step 409 of receiving, via the second interactive toggle in the graphical user interface 309, a user selection to reconfigure the plurality of icons based on a specific criterion, wherein the specific criterion may include one or more of the transfer permission, the transfer authorization, and the vesting class. A user selection to reorganize the plurality of icons may be an indication input by the second entity into information entry fields 310, which may be included in user interface 309 in second entity computing device 306. In some embodiments, the selection to reorganize may be a button included in information entry fields 310. If the selection to reorganize is input into information entry fields 310 at either second entity computing device 306 or first entity computing device 314, or both, then the reconfiguration selection may be transmitted to processor 301 over network 305, and processor may store the selection to reorganize in memory 302.

The specific criterion may be the conditions used to sort the icons on visualization output 311 into lists, which will be described more fully below. The specific criterion may be the transfer permission or transfer authorization associated with each electronic identifier further associated with each first entity, or the vesting class associate with the first entity, which have been previously described.

Icons may be generated by processor 301 and/or 307 by accessing data stored in the directory entries of steps 405 and 406, or by accessing the sorted lists described in step 409, as will be further described below.

Method 400 may include further steps that may be responsive to receiving the user selection to reconfigure the plurality of icons in step 409. Method 400 may include a step 410 of automatically reconfiguring the plurality of icons on the graphical user interface based on vesting class, wherein each icon is visually displayed in one of the at least one first tabs based on vesting class.

Automatically reconfiguring may be the action of changing how the icons are visually displayed or arranged on visualization output 311. For example, automatically reconfiguring may include moving icons to a different position on visualization output 311 of the graphical user interface 309, or may include moving an icon from one tab into another tab for display. A first tab may be a tab in visualization output 311 that displays all the icons of first entities that are associated with a given vesting class. For example, in some embodiments, there may be three first tabs, one tab displaying icons of entities having a vesting class set to standard, one tab displaying icons of entities having a vesting class set to accelerated, and one tab displaying icons of first entities having a vesting class set to terminated. As new data is received, for example, through step 402, a new vesting class may be determined and assigned to any given first entity, for example, in step 404. When the user, which may be a first entity or the second entity, uses the second interactive toggle in the graphical user interface to indicate the plurality of icons should be reconfigured, the icons may be reconfigured into the appropriate first tab based on any new or updated vesting class.

Responsive to receiving the user selection to configure the plurality of icons, method 400 may include a step 411 of automatically reconfiguring the plurality of icons on the graphical user interface based on the plurality of lists, wherein each icon is visually displayed in one of the plurality of second tabs based on the plurality of lists. In some embodiments, the automatically reconfiguring may include moving icons from one of the plurality of second tabs to another one of the plurality of second tabs for display. For example, each of the plurality of second tabs may include icons from a subgrouped list of icons. A subgrouped list of icons may be generated when the icons are automatically reconfigured based on new or updated data received in step 402. A subgrouped list of icons may be any grouping of the reconfigured icons within each of the plurality of second tabs. For example, each first entity may be represented by an icon. The icons associated with each first entity may be included in a subgrouped list of icons. Each subgrouped list of icons may be associated with for example, a vesting class or an electronic transfer status. As an example, the list of icons may be subgrouped into categories such as "permitted, authorized," "permitted, not authorized," or "not permitted." When an entity views each of the plurality of second tabs in visualization output 311, the entity now may see the icons have moved into a new tab for visual display.

Step 411 may reconfigure the icons representing first entities' upcoming electronic transfers on visualization output 311 by adding and removing first entities and their upcoming electronic transfers from the first, second, and third sub groupings. For example, if a subgrouped list is stored in memory 302 and/or 308 as a linked list, then each node of the linked list may contain a data field containing the data set for a first entity and its upcoming electronic transfer, along with a pointer to a location in memory 302 and/or 308 of the next first entity and their upcoming electronic transfer. By way of example, if a first entity's data set and next upcoming electronic transfer is presently in the second subgrouped list, and then if that electronic transfer has its transfer authorization subsequently changed to authorized, then processor 301 and/or 307 may remove that upcoming electronic transfer from the second subgrouped list and processor 301 and/or 307 may add it to the first subgrouped list. By performing these techniques, the subgrouped lists stored in memory 302 and/or 308 may be automatically kept up to date in real time as data in each first entities' data set changes. Visualization output 311 on user interface 309 may further be refreshed by using the second interactive toggle of step 409. Processor 301 may communicate over network 305 the updated subgrouped lists to processor 307 included in second entity computing device 306. Processor 307 may store the updated subgrouped lists in memory 308. As described above, each subgrouped list may include a linked list comprising a plurality of nodes that may correspond to a data set for a first entity and its electronic transfer. Each icon that may be displayed on visualization output 311 may correspond to a node in the linked list. Processor 307 may automatically send icons corresponding to each node of the updated subgrouped lists as display 313 to visualization output 311 that may then display the updated and reconfigured subgrouped lists on visualization output 311 in the form of icons.

Reconfiguring may include different visual effects on visualization output 311. For example, in some embodiments, automatically reconfiguring the plurality of icons on user interface 309 may comprise automatically recoloring the plurality of icons on user interface 309. In such embodiments where reconfiguring involves recoloring, processor 301 and/or 307 may display each icon displayed on visualization output 311 where each icon is colored according to the subgrouped list that the first entity and its upcoming electronic transfer are in. In some embodiments, the automatic recoloring may comprise automatically colouring an icon a first color (such as green) if the transfer permission is set to permitted and the transfer authorization is set to authorized. In some embodiments, the automatic recoloring may comprise automatically recoloring an icon a second color (such as red) if the transfer permission is set to permitted and if the transfer authorization is set to not authorized. In some embodiments, the automatic recoloring may comprise automatically recoloring an icon a third color (such as grey) if the transfer permission is set to not permitted.

In some embodiments the automatic reconfiguring of the plurality of icons on the graphical user interface may comprise arranging the icons into a list displayed on different sections of the graphical user interface. For example, there may be a separate section of visualization output 311 for icons in each subgrouped list. This technique will be further described with reference to FIG. 8. In some embodiments, the automatic reconfiguring of the plurality of icons on user interface 309 may comprise arranging the icons into different tabs. These tabs may be different displays represented on visualization output 311 that the first entity or the second entity may toggle between by selecting the desired tab for display using information entry fields 310. Arranging the icons into different tabs may be achieved according to techniques described herein, especially with regard to FIG. 4, except where tabs are displayed on visualization output 311 instead of different sections.

In some embodiments, the automatic reconfiguring of icons using method 400 may further comprise automatically recoloring one or more of the icon. For example, an icon may be automatically recolored green if the transfer permission is set to permitted and the transfer authorization is set to authorized. In another example, an icon may be automatically recolored red if the transfer permission is set to permitted and the transfer authorized is set to not authorized. In another example, an icon may be automatically recolored grey if the transfer permission is set to not permitted.

Method 400 may include a step 412 of displaying, within each icon on the graphical user interface, at least one of the first entity identifier associated with the first entity, the electronic transfer identifier associated with the first entity, the transfer permission associated with the electronic transfer identifier, or the transfer authorization associated with the electronic transfer identifier. Each of the first entity identifier, electronic transfer identifier, transfer permission, or the transfer authorization may be defined consistent with disclosed embodiments described herein.

A vesting class may be a value stored in memory 302 and/or 308 as a part of a data set of a first entity. Method 400 may improve computer performance speed because processor 301 and/or 307 need not transmit as much data as is required in electronic transfers currently known in the art. To coordinate and initiate the electronic transfer, the processor 301 and/or 307 may transmit a vesting class between the first entity and second entity. A vesting class may comprise information that has no intrinsic value. A vesting class may also comprise less data than the sensitive first entity and second entity related information that is transmitted in conventional systems and methods. Accordingly, when a vesting class is determined for a first entity, that vesting class may be stored in memory 302 and/or 308 and used to schedule and track future electronics transfers. The vesting class may act as a proxy for the given first entity for as long as the first entity remains qualified for that vesting class. The data used to determine the vesting class, which may be voluminous, may not need to be processed or received by processor 301 and/or 307 for as long as the given first entity remains qualified for their assigned vesting class. When a first entity's qualification data changes so that it is no longer qualified for its given vesting class, the vesting class may be redetermined. However, using a vesting class as a proxy may reduce the amount of time the first entity's qualification data needs to be accessed or processed by processor 301 and/or 307. Conventional methods may require receiving and transmitting large amounts of data related to sensitive first entity and second entity information (for example, account numbers, routing numbers, billing addresses, the transferor's full name, the payor's full name, or in the context of fund transfers, credit card number, security code, or card expiration date, as well as sensitive information related to the employee's job role and performance used to determine their appropriate vesting class) and method 400 may reduce the need to transmit sensitive first entity and second entity information thereby providing increased security.

Computer performance speed may relate to how much data processor 301 and/or 307 is required to transmit. Method 400 may allow for processor 301 and/or 307 to use transmitted vesting classes to automatically track electronic transfer eligibility and status, as a proxy for voluminous sensitive first entity and second entity related data used in conventional systems and methods. However, the vesting class itself may comprise a string of letters and/or numbers that may constitute a relatively small amount of data. Therefore, method 400 may improve computer performance speed by allowing processor 301 and/or 307 to transmit and receive vesting classes rather than native first entity or second entity, or electronic repository, information. A native data format refers to a file structure of an electronic document as defined by the application that created that electronic document. For example, if a spreadsheet file was created using Excel, then that document's native format is its original Excel format. Instead, electronic transfers may be scheduled and tracked using vesting classes as disclosed herein, which may comprise less data than the native first entity and second entity data. The vesting class itself may be data in a non-native format, for example, the vesting class may be a string of letters and/or numbers that acts as a proxy for more voluminous data. Therefore, not transmitting native first entity and second entity data may lead to improved computational efficiency by scheduling and tracking electronic transfers with less data transmission because the vesting class serves as a proxy for otherwise more voluminous data.

Method 400 may improve computer performance by conserving computer memory in memory 302 and/or 308. Method 400 may allow for a vesting class to be stored in memory 302 and/or 308, instead of saving the voluminous data used to generate the vesting class in its raw native format. Storing vesting classes may require less memory, and therefore, storing vesting classes rather than raw entity repository information may conserve memory in memory 302 and/or 308. The vesting class may allow for minimal memory usage because only the vesting class and entity identifier need to be stored by the involved entities (e.g., the first entity or the second entity), rather than storing voluminous data associate with the entities. A vesting class may be a very small string of letters, numbers, and/or characters. A vesting class may be a single number stored in memory (e.g., default="0," accelerated="1," and terminated="2"). Beyond conserving memory, method 400 may also improve computer performance speed with reference to memory 302 and/or 308 because processor 301 and/or 307 need not access multiple data structures. Instead, a vesting class may be stored in a single data structure, as opposed to voluminous first entity or second entity data that may require storage in multiple data structures in memory 302 and/or 308. Accessing data structures may involve accessing buffers in memory 302 and/or 308. Computer performance speed may decrease with increasing the number of buffers that processor 301 and/or 307 needs to access in memory 302 and/or 308. By requiring processor 301 and/or 307 to access a single data structure instead of multiple data structures (and thereby reducing the number of buffers that processor 301 and/or 307 must access), method 400 may improve computer performance speed. Once a vesting class for a first entity is generated by processor 301 and/or 307, the vesting class may be stored in memory 302 and/or 308 without also needing to store the native and voluminous data used to generate it. Processor 301 and/or 307 may then use the stored value representing the vesting class to track electronic transfer vesting statuses and generate updates on user interface 309 accordingly when the second entity indicates its wish to update the first entity's vesting statuses. An indication to update a first entity's vesting status may be the same as the user selection to reorganize the plurality of icons, because by making this selection, processor 301 and/or 307 may redetermine the first entity's vesting status based on current data.

Figure 5:
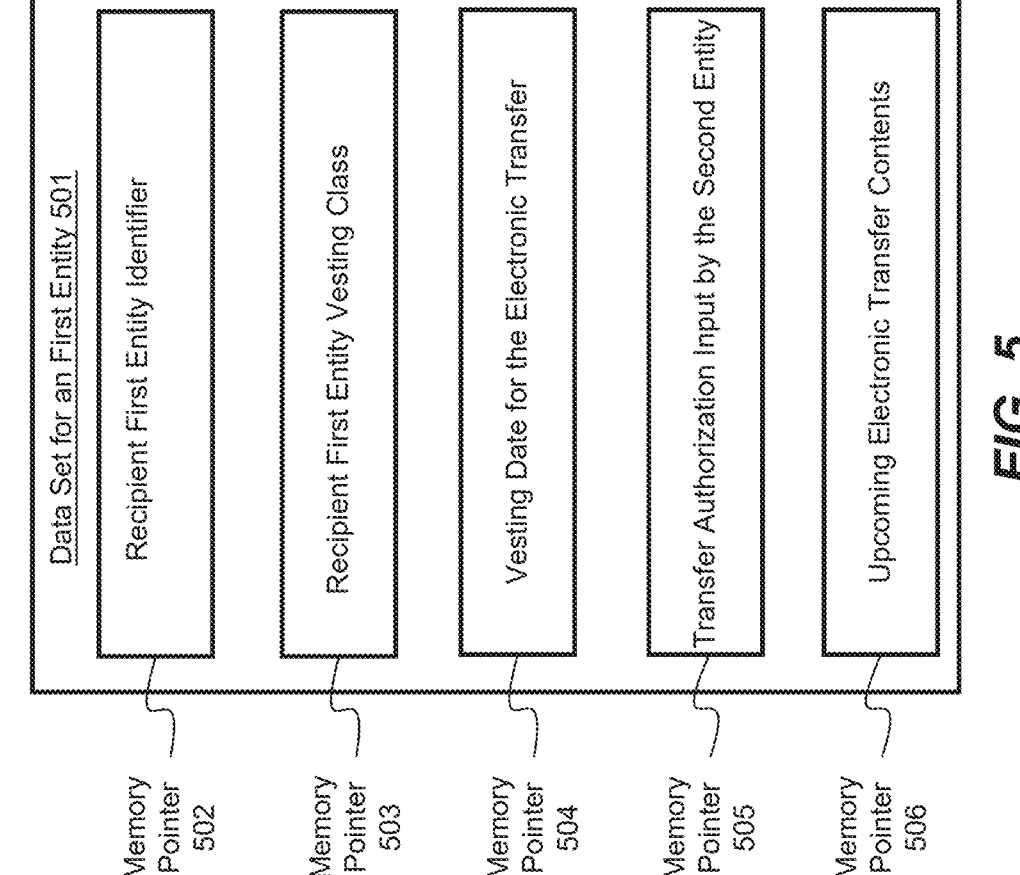
FIG. 5 illustrates an exemplary data set in memory, consistent with disclosed embodiments.

FIG. 5 illustrates an exemplary data set for a first entity 501 in memory 302, consistent with disclosed embodiments. The exemplary data set for a first entity 501 shown in FIG. 5 is an example of a data set, as defined above, that is stored in memory 302 in the form of a linked list, therefore associating all the stored elements of the data set in memory 302. The exemplary data set for a first entity 501 may include a memory pointer 502 to a recipient first entity in memory 302. The exemplary data set for a first entity 501 may contain a memory pointer 503 to a recipient first entity vesting class. The exemplary data set for a first entity 501 may include a memory point 504 to a vesting date for the electronic transfer. The exemplary data set for a first entity 501 may include a memory pointer 505 to a transfer authorization input by the second entity. The first entity identifier, first entity vesting class, vesting date for an electronic transfer, and the transfer authorization input by the second entity may all have meanings consistent with the definitions provided above in the present disclosure. The exemplary data set for a first entity 501 may further include a memory point 506 that may be a memory pointer pointing to a location in memory of an upcoming electronic transfer for the given first entity. As described herein, the contents of the electronic transfer may be electronic funds stored in a bank account, or in other embodiments, they may be electronic files stored in an electronic folder.

Figure 6:
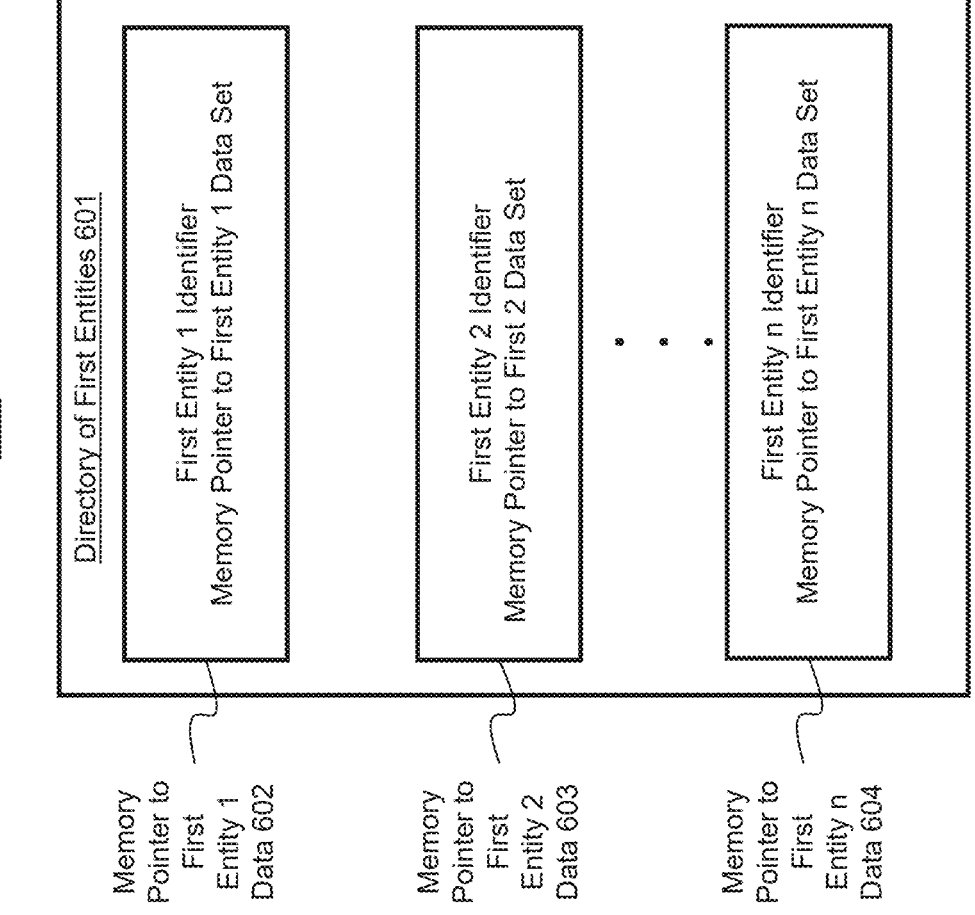
FIG. 6 illustrates an exemplary directory of first entities in memory, consistent with disclosed embodiments.

FIG. 6 illustrates an exemplary directory of first entities 601 in memory 302, consistent with disclosed embodiments. As described above, a client entity may store a directory of all, or a subset of, the first entities and their upcoming electronic transfers. The directory may consist of data sets for each first entity's upcoming electronic transfer that are associated in memory 302. For example, directory of first entities 601, as shown in FIG. 6, illustrates an exemplary directory of first entities that is stored in memory 302 as a linked list. The exemplary directory of first entities 601 may include a memory pointer to first entity 1, which may point to a location in memory 302 storing a first entity 1 identifier and a further memory pointer to a first entity 1 data set. This data set may be consistent with the exemplary data set illustrated in FIG. 5. The exemplary directory of first entities 301 may further include a memory pointer to first entity 2 data 603 and a memory pointer to first entity n 604. These memory pointers 603 and 604 may point to similar data stored in memory 302 as memory pointer to first entity 1 data 602, except with regard to first entity 2 through n, respectively. Entity n may be the last first entity in exemplary directory of first entities 601, where "n" may be any number of first entities. Once stored, processor 301 may access data at locations in memory 302 specified by the memory pointers.

Figure 7:
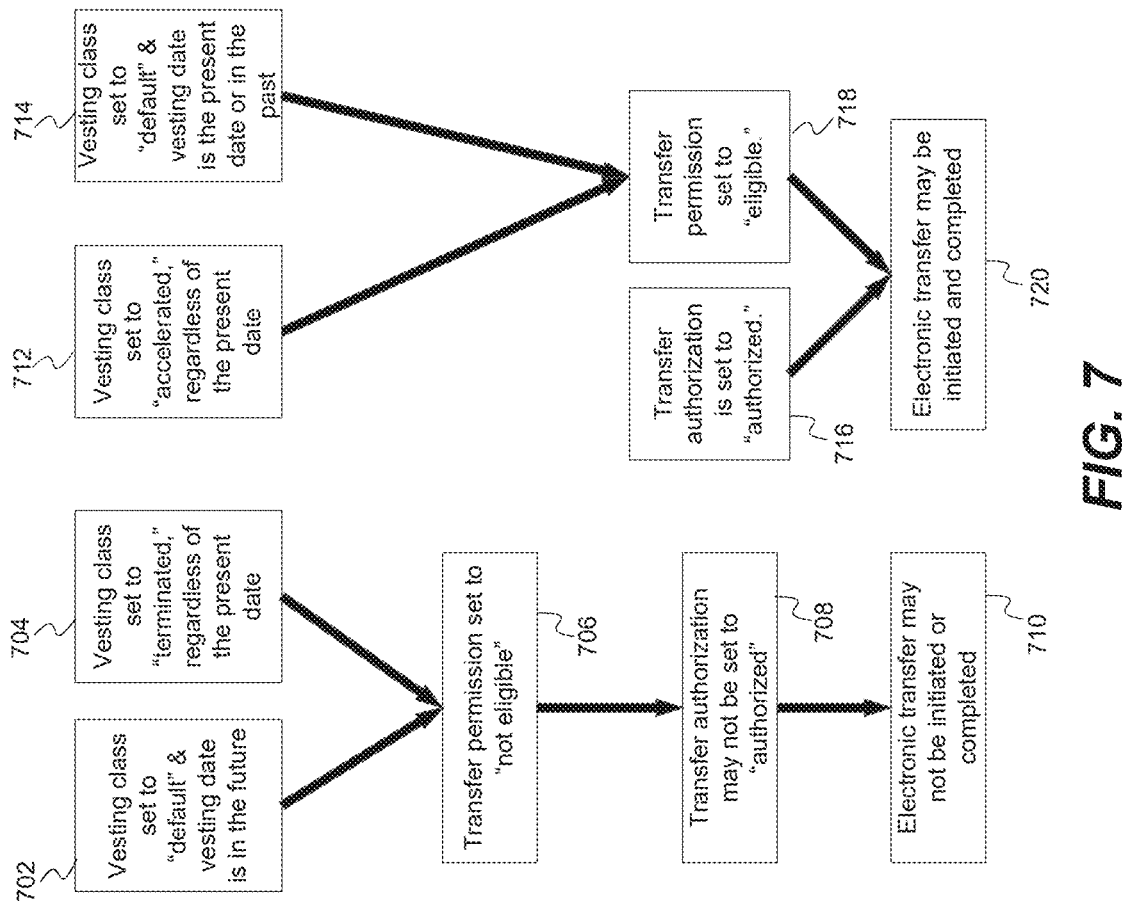
FIG. 7 illustrates an exemplary decision tree demonstrating how electronic transfers may be initiated and completed, consistent with disclosed embodiments.

FIG. 7 illustrates an exemplary decision tree demonstrating how electronic transfers may be initiated and completed, consistent with disclosed embodiments. As shown in FIG. 7, in some embodiments, if vesting class is set to "default" and the vesting date is in the future as depicted in block 702, then the transfer permission may be set to "not eligible," as depicted in block 706. Similarly, in some embodiments, if the vesting class is set to "terminated," regardless of the present date, as depicted in block 704, then the transfer permission may be set to "not eligible," as depicted in block 706. In such embodiments where the transfer permission is set to "not eligible," as depicted in block 706 then the transfer authorization may not be set to "authorized," as depicted in block 708. Further, in such embodiments, the electronic transfers may then not be initiated or completed, as shown in block 710. In some embodiments, if the vesting class is set to "accelerated," regardless of the present date, as depicted in block 712 then the transfer permission may be set to "eligible," as depicted in block 718. Similarly, in some embodiments, if the vesting class is set to "default" and the vesting date is the present date or in the past, as depicted in block 714, then the transfer permission may be set to "eligible," as depicted in block 718. Further, also shown in FIG. 7, in such embodiments where the transfer permission is set to "eligible," the transfer authorization may be set to "authorized," as depicted in block 716. In such embodiments, if the transfer authorization is set to "authorized," and if the transfer permission is set to "eligible," then the electronic transfer may be initiated and completed, as depicted in block 720. The transfer permissions may need to be set to "eligible" as depicted in block 718, to indicate that the first entity is permitted to receive an electronic transfer based on the vesting class, the vesting date, or any other vesting variables described herein. The transfer permission may also need to be set to authorized for an electronic transfer to be initiated and completed. Setting a transfer permission to authorized indicates that the second entity has approved the electronic transfer that the first entity is eligible to receive.

Figure 8:
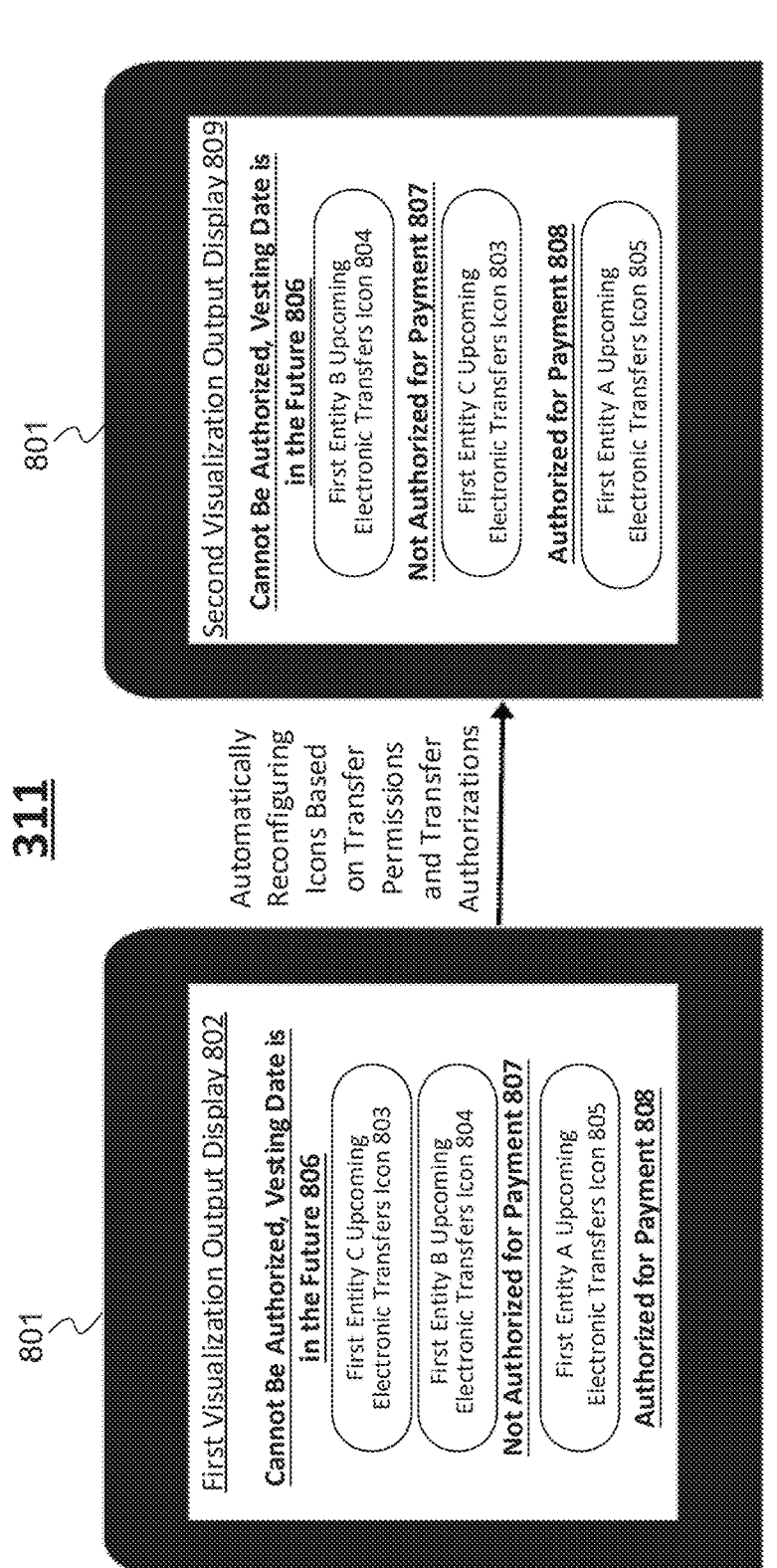
FIG. 8 illustrates an exemplary display on a graphical user interface wherein icons representing first entities and their upcoming electronic transfers are automatically rearranged based on a transfer permission and a transfer authorization, consistent with disclosed embodiments.

FIG. 8 illustrates an exemplary display on a graphical user interface wherein icons representing first entities and their upcoming electronic transfers may be automatically rearranged based on a transfer permission and a transfer authorization. In some embodiments, FIG. 8 illustrates an exemplary output of method 400, as shown in FIG. 4, on a graphical user interface. The second visualization output display 809 may be a display on a graphical user interface of second entity's computing device 801. Second entity computing device 801 may correspond to second entity computing device 306, as disclosed herein with respect to FIG. 3. In FIG. 8, the first entities may be, for example, employees employed by an exemplary second entity, which may be an employer in this example.

FIG. 8 illustrates a first visualization output display 802, which may represent a visualization output display before executing process 400, and a second visualization output display 809, which may represent a visualization output display after executing process 400. The first visualization output display 802 shows three first entities and their upcoming electronic transfers displayed as icons, first entity A upcoming electronic transfers icon 805, first entity B upcoming electronic transfers icon 804, and first entity C upcoming electronic transfers icon 803. As described above with respect to FIG. 4, each of first entity A upcoming electronic transfers icon 805, first entity B upcoming electronic transfers icon 804, and first entity C upcoming electronic transfers icon 803 may correspond to a node in a linked list that may store data associated with each of first entity A, first entity B, and first entity C. Each of first entity A upcoming electronic transfers icon 805, first entity B upcoming electronic transfers icon 804, and first entity C upcoming electronic transfers icon 803 may comprise a visual representation of each node in the linked list to be displayed on first visualization output display 802 and second visualization output display 809. As shown in FIG. 8, first entity A upcoming electronic transfers icon 805, first entity B upcoming electronic transfers icon 804, and first entity C upcoming electronic transfers icon 803 may be arranged based on the electronic transfer permissions and transfer authorization of the respective first entities A, B, and C and their upcoming electronic transfers. The electronic transfer permissions and transfer authorizations may be determined in accordance with process 400, as disclosed herein with respect to FIG. 4. The first visualization output display 802 may display different sections that first entities and their upcoming electronic transfers may be grouped into. For example, first visualization output display 802 may display a section titled Cannot Be Authorized, Vesting Dates is in the Future 806, a section titled Not Authorized for Payment 807, and a section titled Authorized for Payment 808. The three icons 803, 804, and 805 may be displayed in groups based on the transfer permissions and transfer authorizations they are associated with. These transfer permissions and transfer authorizations may be determined using techniques disclosed herein, especially with reference to method 400.

FIG. 8 illustrates how the display on visualization output 311 may be automatically updated as the electronic transfer permissions and transfer authorizations are updated in real time. The second visualization output display 809 may be a display on a graphical user interface of second entity's computing device 801. Second entity computing device 801 may correspond to second entity computing device 306, as disclosed herein with respect to FIG. 3. The second visualization output 809 illustrates the display after the first entity A upcoming electronic transfers icon 805, first entity B upcoming electronic transfers icon 804, and first entity C upcoming electronic transfers icon 803 are automatically rearranged. The automatic rearranging may be performed because the transfer permissions or transfer authorizations of electronic transfers associated with the first entities A, B, and C changed. For example, first entity A upcoming electronic transfers icon 805 may have moved from the list titled Not Authorized for Payment 807 to the list titled Authorized for Payment 808 because the second entity changed the transfers authorization from "not authorized" to "authorized" using information entry fields 310. As another example, first entity C upcoming electronic transfers icon 803 may have moved from the list titled Cannot Be Authorized, Vesting Date is in the Future 806 to the list titled Not Authorized for Payment 807 because, through the passage of time, the vesting date for first entity C's next upcoming electronic transfer is the present day or in the past.

As a whole, method 400 may provide an improved graphical user interface because processor 301 and/or 307 need not open up additional applications to determine a first entity's status within the client entity. The graphical user interface presented through method 400 may be simplified and more clearly organized without displaying a voluminous amount of data that a user must review to determine a first entity's status. This may be because the vesting class may serve as a proxy for voluminous qualification data that may otherwise need to be processed by processor 301 and/or 307 to determine a first entity's status. Instead, the first entity's status within the client entity is consolidated and represented by the vesting class. Therefore, instead of opening or running additional applications to determine the status of a first entity within the client entity, processor 301 and/or 307 may only need to access the vesting class in memory 302 and/or 308. Additionally, because the first entities' statuses are consolidated and represented by vesting classes, the graphical user interface may present a clearly organized summary of the voluminous amount of data that supports the vesting class status of each first entity, as shown in FIG. 8.

Figure 9A:
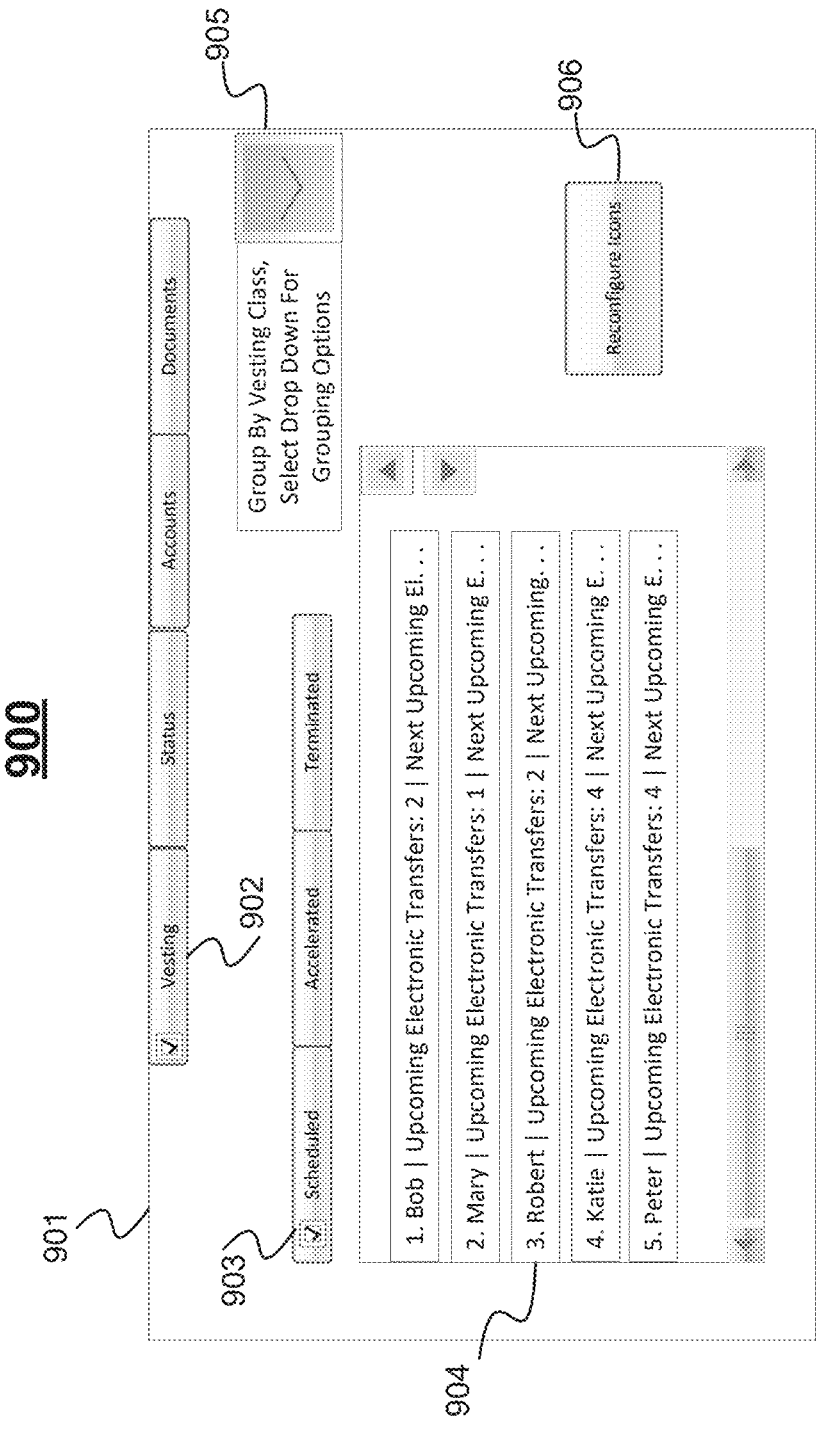
FIG. 9A illustrates an exemplary display on a graphical user interface wherein icons representing first entities and their upcoming electronic transfers are automatically rearranged based on a transfer permission and a transfer authorization in a vesting tab, consistent with disclosed embodiments.

FIG. 9A illustrates an exemplary display on a graphical user interface wherein icons representing first entities and their upcoming electronic transfers are automatically rearranged based on a transfer permission and a transfer authorization in a vesting tab, consistent with disclosed embodiments. FIG. 9A illustrates exemplary dashboard configuration 900. Dashboard configuration 900 may display windows, such as window 901. Window 901 may display a plurality of tabs 902, and in some embodiments, the plurality of tabs 902 may include tabs such as "vesting," "status," "accounts," and/or "documents." In FIG. 9A, the "vesting" tab is selected, indicated by the check mark. The tab selected in the plurality of tabs 902 may control which window is displayed in dashboard configuration 900. For example, when the "vesting" tab is selected among the plurality of tabs 902, then window 901 may be displayed. As described below, when other tabs among the plurality of tabs 902 are selected, different windows may be displayed. Thus, this plurality of tabs 902 may allow for navigation throughout dashboard configuration 900, as a user may select one tab at a time.

Window 901 may display another plurality of tabs 903. This further plurality of tabs 903 may include "scheduled," "accelerated," and/or "terminated" tabs. In some embodiments, this plurality of tabs 903 may be the at least one first tab references in method 400. The window 901 displayed in FIG. 9A may include an entity list 904. In some embodiments, the entities in entity list 904 may be the first entities referenced in method 400, which may be, for example, employees of a company. In some embodiments, the company employing said employees may be the second entity referenced in method 400. In some embodiments, window 901 may include a dropdown menu 905 that may allow a user to select the criteria upon which the entity list 904 may be sorted. Window 901 may further include an interactive toggle 906 for reconfiguring the icons in entity list 904. Interactive toggle 906 may be the second interactive toggle referenced in method 400. When clicked or selected, interactive toggle 906 may initiate a method such as the method described in method 400 for processing new data and automatically reconfiguring the entity icons displayed in entity list 904 within window 901, and within other windows included in dashboard configuration 900.

Figure 9B:
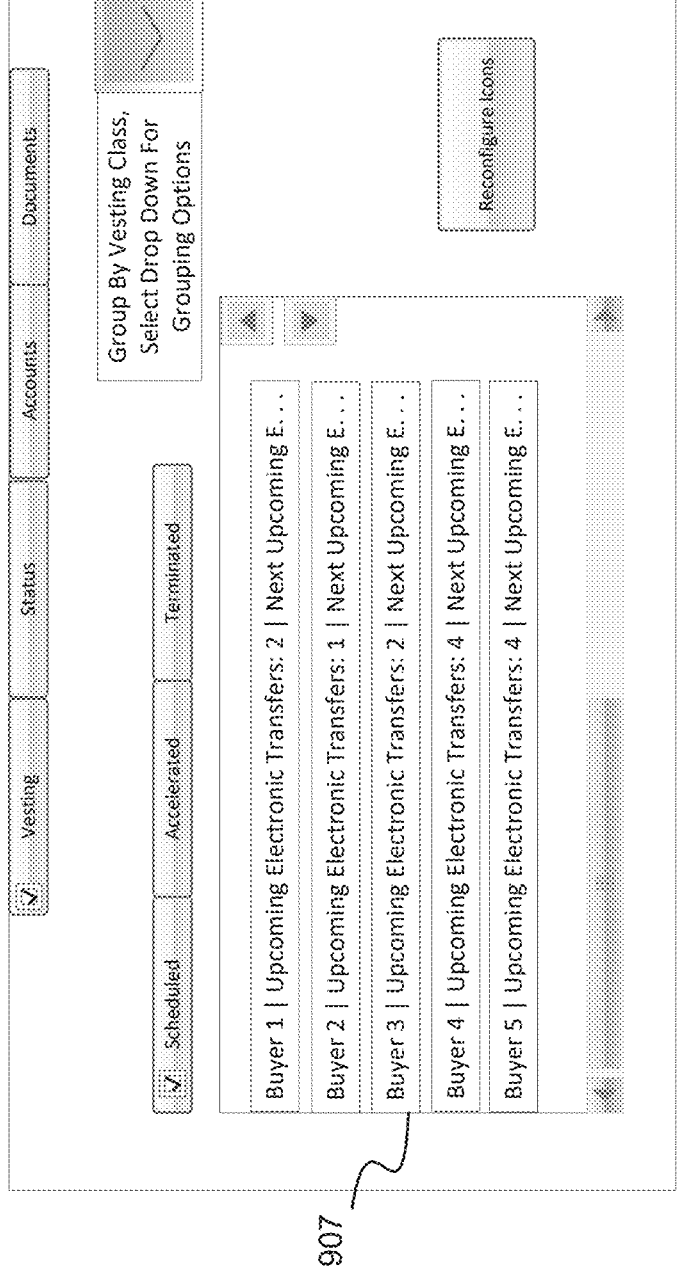
FIG. 9B illustrates an exemplary display on a graphical user interface wherein icons representing first entity buyers and their upcoming electronic transfers are automatically rearranged based on a transfer permission and a transfer authorization in a vesting tab, consistent with disclosed embodiments.

FIG. 9B illustrates an exemplary display on a graphical user interface wherein icons representing first entity buyers and their upcoming electronic transfers are automatically rearranged based on a transfer permission and a transfer authorization in a vesting tab, consistent with disclosed embodiments. FIG. 9B illustrates a dashboard configuration similar to that in FIG. 9A. However, FIG. 9B illustrates some embodiments where an entity list 907 may include entities that include buyers of shares of a company, such as parties to a merger, rather than employees of an employer as displayed in entity list 904.

Figure 9C:
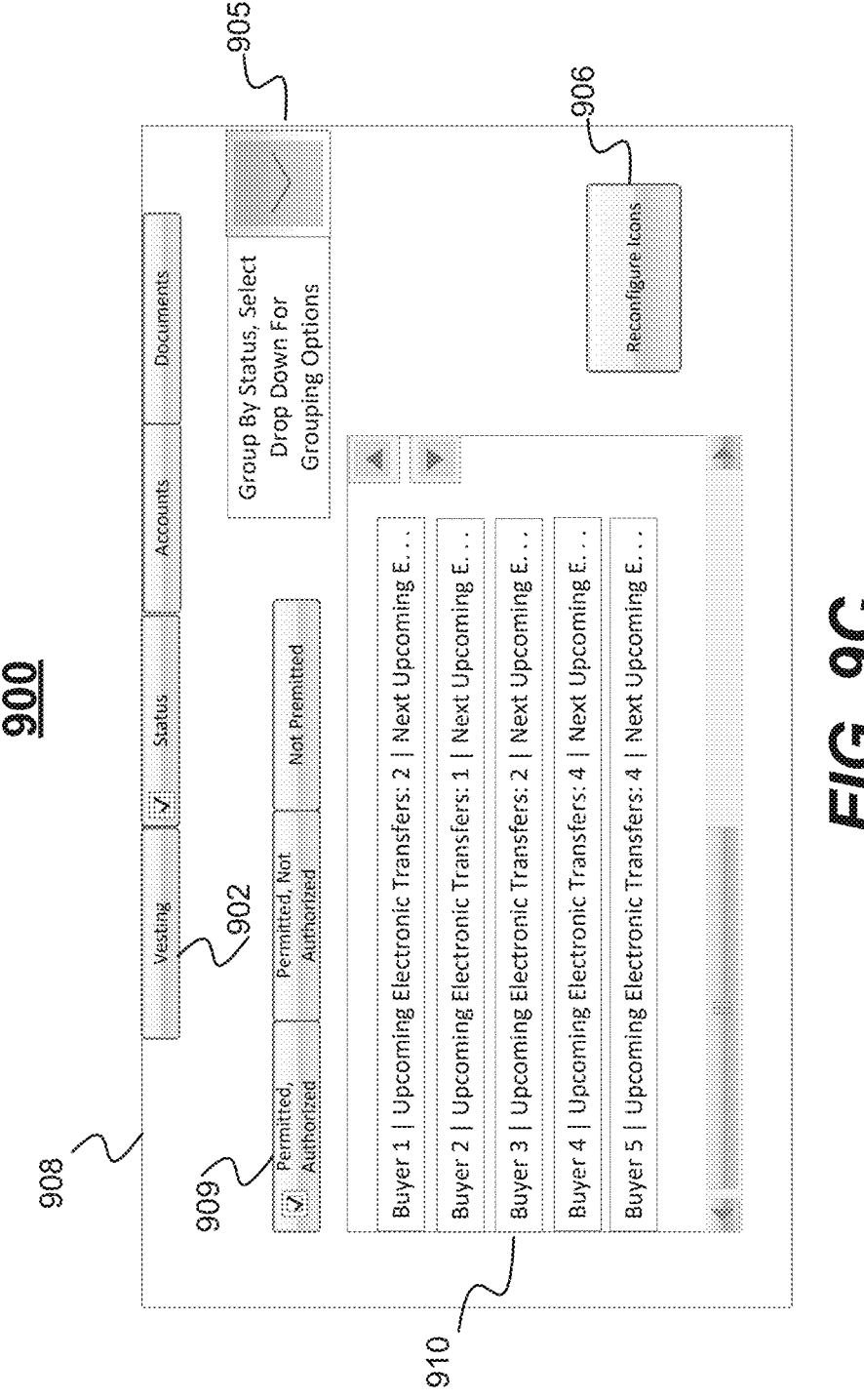
FIG. 9C illustrates an exemplary display on a graphical user interface wherein icons representing first entities and their upcoming electronic transfers are automatically rearranged based on a transfer permission and a transfer authorization in a status, permitted, authorized tab, consistent with disclosed embodiments.

FIG. 9C illustrates an exemplary display on a graphical user interface wherein icons representing first entities and their upcoming electronic transfers may be automatically rearranged based on a transfer permission and a transfer authorization in a status, permitted, authorized tab, consistent with disclosed embodiments. FIG. 9C illustrates exemplary dashboard configuration 900. Dashboard configuration 900 may display windows, such as window 908. In some embodiments, similar to window 901 above, window 908 may display a plurality of tabs 902, and in some embodiments, the plurality of tabs 902 may include tabs such as "vesting," "status," "accounts," and/or "documents." In FIG. 9C, the "status" tab is selected, indicated by the check mark. As described above, the tab selected in the plurality of tabs 902 may control which window is displayed in dashboard configuration 900. For example, when the "status" tab is selected among the plurality of tabs 902, then window 908 may be displayed. Thus, this plurality of tabs 902 may allow for navigation throughout dashboard configuration 900.

Window 908 may display another plurality of tabs 909. This further plurality of tabs 909 may include "Permitted, Authorized," "Permitted, Not Authorized," and/or "Not Permitted" tabs. In some embodiments, this plurality of tabs 909 may be the plurality of second tabs in method 400. The window 908 displayed in FIG. 9C may include an entity list 910. In some embodiments, the entities in entity list 910 may be the first entities referenced in method 400, which may be, for example, employees of a company. In some embodiments, the company employing said employees may be the second entity referenced in method 400. Entity list 910 may be different from entity list 904 because entity list 904 may be organized by vesting classes, and entity list 910 may be arranged by electronic transfer status. Electronic transfer status may include whether the electronic transfer is permitted and/or authorized, consistent with disclosed embodiments.

In some embodiments, window 908 may include a drop-down menu 905 that may allow a user to select the criteria upon which the entity list 904 is sorted. Window 908 may further include an interactive toggle 906 for reconfiguring the icons in entity list 904. Interactive toggle 906 may be the second interactive toggle referenced in method 400. When clicked or selected, interactive toggle 906 may initiate a method such as the method described in method 400 for processing new data and automatically reconfiguring the entity icons displayed in entity list 910 within window 908, and within other windows included in dashboard configuration 900.

Figure 9D:
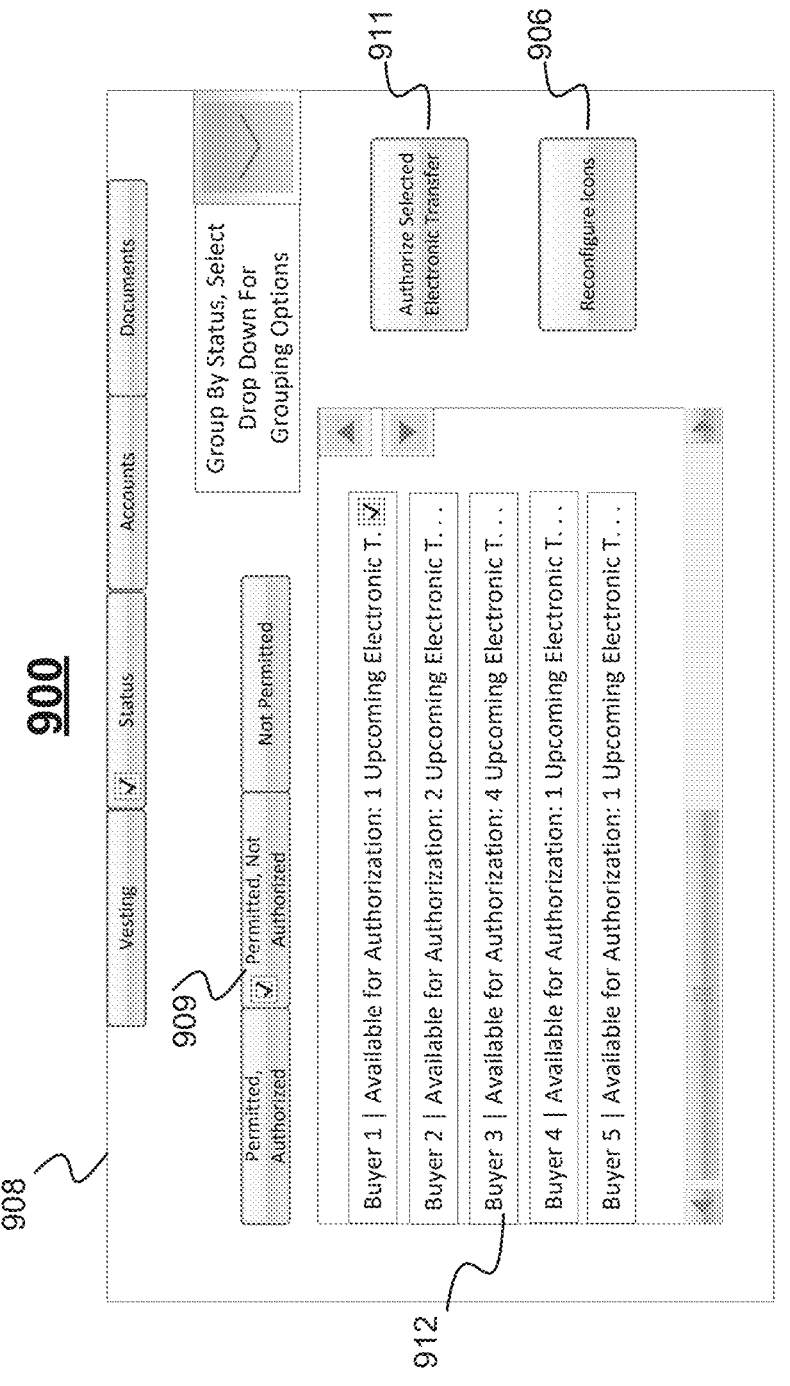
FIG. 9D illustrates an exemplary display on a graphical user interface wherein icons representing first entities and their upcoming electronic transfers are automatically rearranged based on a transfer permission and a transfer authorization in a status, permitted, not authorized tab, along with an authorize toggle, consistent with disclosed embodiments.

FIG. 9D illustrates an exemplary graphical user interface dashboard configuration display on visualization output 311. FIG. 9D illustrates exemplary dashboard configuration 900. Dashboard configuration 900 may display windows, such as window 908. FIG. 9D illustrates an exemplary display on a graphical user interface wherein icons representing first entities and their upcoming electronic transfers may be automatically rearranged based on a transfer permission and a transfer authorization in a status, permitted, not authorized tab, along with an authorize toggle, consistent with disclosed embodiments. FIG. 9D illustrates exemplary dashboard configuration 900. Dashboard configuration 900 may display windows, such as window 908, which is explained above. Window 908 may contain a plurality of tabs 909 and entity list 912, consistent with those embodiments described in the present disclosure. FIG. 9D illustrates the tab with the plurality of tabs 909 titled "Permitted, Not Authorized" selected, as indicated by the check mark. Consistent with disclosed embodiments, such a combination of permitted and not authorized may make an electronic transfer available to be authorized. Therefore, in some embodiments, window 908 may display an interactive toggle 911 that may allow for authorizing a selected electronic transfer or selected group of electronic transfers, such as, for example, those displayed in entity list 912. In some embodiments, this interactive toggle 911 may be the first interactive toggle for setting a transfer authorization, consistent with disclosed embodiments. Entity list 912 may be different from entity list 910 because entity list 910 may display first entities that have a transfer status of "permitted, authorized," and entity list 912 may display first entities that have a transfer status of "permitted, not authorized."

Figure 9E:
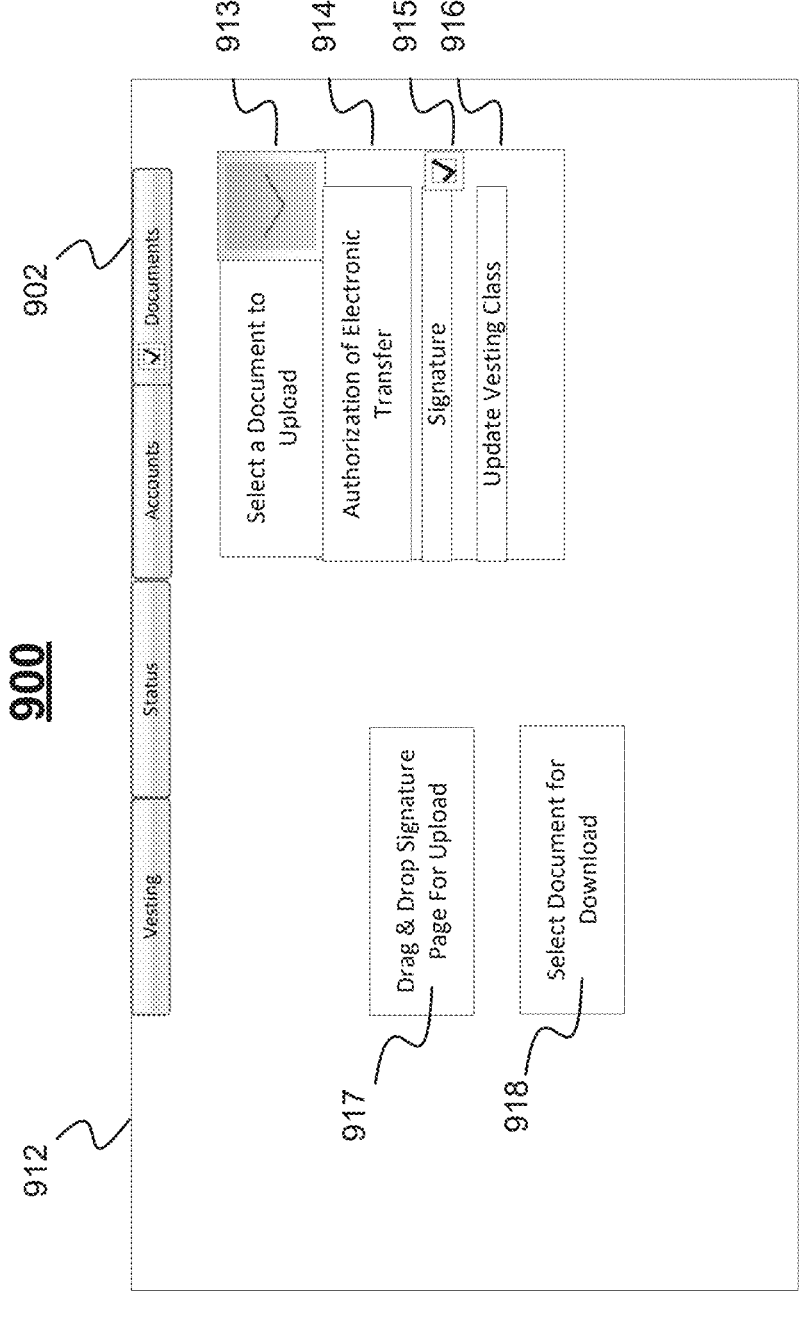
FIG. 9E illustrates an exemplary display on a graphical user interface wherein documents may be uploaded and downloaded, consistent with disclosed embodiments.

FIG. 9E illustrates an exemplary display on a graphical user interface wherein documents may be uploaded or downloaded, consistent with disclosed embodiments. FIG. 9E illustrates exemplary dashboard configuration 900. Dashboard configuration 900 may display windows, such as window 912. Window 912 may display a drop-down menu 913 with options for actions such as, for example, "Authorization for Electronic Transfer" 914, "Signature" 915, and "Update Vesting Class" 916. Authorization for Electronic Transfer 914 may be another way to provide a transfer authorization, consistent with disclosed embodiments. Signature 915 may be an option to upload evidence of an electronic transfer authorization, which in some embodiments, may be a signature page. Window 912 may include an upload modal 917. In some embodiments, upload modal 917 may be a confirmation modal that allows for confirmation evidence of a transfer authorization to be uploaded. A confirmation modal may be a user interface element within window 912, such as the modal "Drag & Drop Signature Page for Upload" displayed in FIG. 9E, that allows for an entity to upload evidence as proof they did in fact authorize a given electronic transfer. Confirmation evidence may be, in some embodiments, a signature page. Such confirmation evidence may be received via the confirmation modal, such as upload modal 917. Processor 301 and/or 307 may store the authorization evidence in the directory entry associated with the first entity associated with the electronic transfer the transfer authorization was received for. Accordingly, processor 301 and/or 307 may subsequently be able to access the confirmation evidence for any given transfer.

FIGS. 9A, 9B, 9C, 9D, and 9E may in some embodiments illustrate a graphical user interface dashboard configuration used by any one of the plurality of first entities called a first entity portal, which may be a transferee entity portal, consistent with disclosed embodiments. A first entity portal may be accessed and displayed on a first entity computing device 314. In some other embodiments, these figures may illustrate a graphical user interface dashboard configuration viewable and used by a second entity called a second entity portal, which may be a client entity portal, consistent with disclosed embodiments. A second entity portal may be viewable and used on a second entity computing device 306. Consistent with disclosed embodiments, within exemplary system 300 shown in FIG. 3A, the relationship between the second entity portal and the first entity portal may be such that the plurality of portals allow second entities to enter data (e.g., transfer authorizations, transfer permissions, historical data, etc.) into second entity computing device 306 and allow first entities to enter data into at least one first entity computing device 314 using exemplary information entry fields 310, as shown in FIG. 3B. The relationship between the second entity portal and the first entity portal may further be that the at least one first entity is an employee of the second entity, and the second entity is an employer. In such embodiments, the second entity may be managing electronic transfers from the second entity to the at least one first entity employee. In other embodiments, the second entity may be a manager overseeing a merger, where the at least one first entities are parties to the merger. In such embodiments, the parties may be making electronic transfers amongst each other, which may be in exchange for other transferred consideration. The second entity portal and the at least one first entity portal may have similar features and displays, consistent with disclosed embodiments above. The second entity portal and the at least one first entity portal may also have varying features given the different positions and roles of the different entities. Some exemplary embodiments and features of second entity portals and first entity portals are described below.

First Entity Portal

Figure 10A:
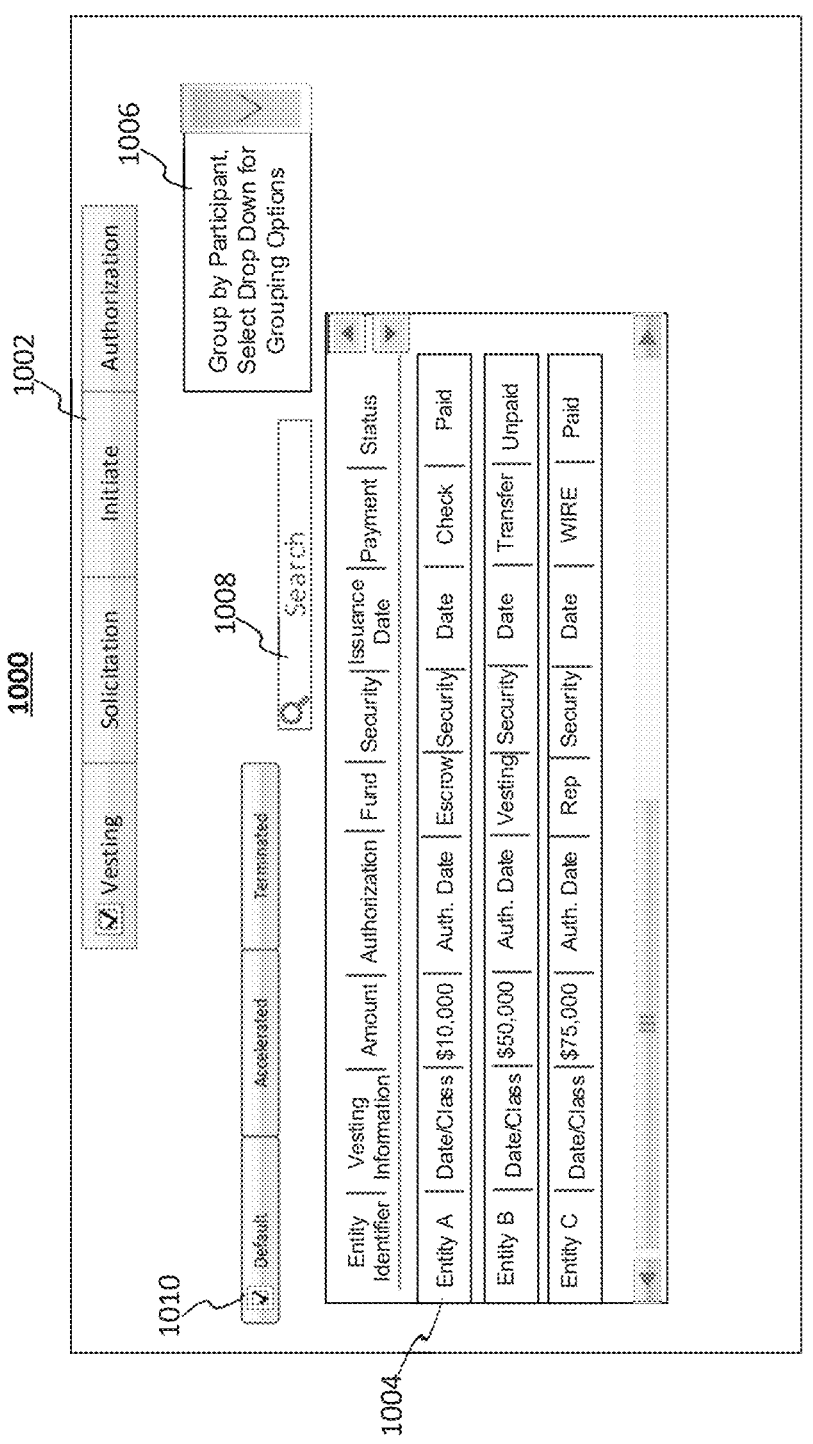
FIG. 10A illustrates an exemplary display on a graphical user interface of a first entity portal displaying an electronic transfers list, consistent with disclosed embodiments.

FIG. 10A depicts a first entity portal 1000 that may be accessible by a first entity to view and manage electronic transfers associated with a second entity. A first entity may view information regarding electronic transfers and each electronic transfer status with a second entity. A first entity may also input information using first entity portal 1000. A first entity portal 1000 may be a dashboard configuration such as user interface 309. The first entity portal 1000, which may be included in user interface 309, may further be included in first entity computing device 314, as shown in FIG. 3A. Processor 307 at first entity computing device 314 may execute a computer application that runs the first entity portal 1000. The first entity may interact with the first entity portal 1000 through information entry fields 310 and view displayed information on user interface 309 via visualization output 311. The first entity portal 1000 may include a plurality of tabs 1002. Tabs 1002 may correspond to tabs 902, as disclosed herein with respect to FIGS. 9A-9E. Tabs 1002 may be a separate page that may be opened within the computer application. The tabs 1002 of the first entity portal 1000 may include a first entity vesting tab, a solicitation tab, initiate electronic transfers tab, and a transfer authorization tab, among other tabs. In some embodiments, the first entity vesting tab may be included visually adjacent to the solicitation tab. In other embodiments, tabs 1002 may be organized in a visually different order.

As depicted in FIG. 10A, the first entity portal 1000 may include a first entity vesting tab, consistent with vesting tabs described above, which may allow first entities to view the vesting schedule amounts for an electronic transfer, so that participant first entities are able to review and approve that the data is accurate. The first entity vesting tab may include and may display an electronic transfers list 1004. The electronic transfers list 1004 may include the vesting information (e.g., vesting date, vesting class), the amount or contents of the electronic transfer (e.g., $10,000.00), the authorization information (e.g., a timestamp recording when the electronic transfer was authorized, a name of an entity that authorized the electronic transfer), fund information that may display in currency format (e.g., vesting fund, escrow fund, and rep fund), security information (e.g., security type and subtype, number of securities), date of issuance, payment information (e.g., displaying the electronic transfer method and the date of the last electronic transfer), and status information (e.g., paid or unpaid). In some embodiments, if the electronic transfer is a payment, and if the payment method is WIRE, then the transferee vesting tab may include the Federal Reference Number (Fed Ref #) once that data is received from the downstream system. The transferee of a WIRE electronic transfer may further receive a Fed Ref #, which may be a unique series of numbers that the transferee may use to investigate and track the electronic wire transfer from an initiating bank to the receiving bank.

The first entity vesting tab may include an electronic transfers list 1004 that the first entity may be associated with when the release type equals vesting. The release type may be a variable that indicates whether the first entity has been assigned a vesting class and whether the electronic transfer has been assigned a vesting date. If the first entity has been assigned a vesting class, and if the relevant electronic transfer has been assigned a vesting date by the second entity, then the release type may equal vesting.

The first entity vesting tab may also include a "group by" drop-down menu 1006 with "participant" being an option. The drop-down menu 1006 may allow for a full list of electronic transfers to be viewable by the first entity. The full list of electronic transfers may display several columns. These columns may include a name column, an email column, a total amount sum (which may include the sum of all amounts associated with a first entity), a paid column (which may include the sum of all electronic transfers that have a corresponding status of "electronic transfer sent"), an unpaid column (which may include the sum of all amounts that do not have a corresponding electronic transfers with the status "electronic transfer sent" or "payment sent"), and a last payment column (which may be the same as the first entity vesting tab). The last payment column may include and may display the electronic transfer method and the date of the last electronic transfer. In some embodiments, if the electronic transfer method is WIRE, then the last payment column may further include and display the Fed Ref #once that data is received from the downstream system. The first entity portal 1000 may include a search bar 1008 to search the database 504 using an input such as a first entity's name or email.

Consistent with disclosed embodiments, the first entity vesting tab may include subtabs 1010. In some embodiments, these subtabs 1010 may include a default subtab, an accelerated subtab, and a terminated subtab. The default subtab may display electronic transfers with the vesting class equal to default. The accelerated subtab may display amounts with the vesting class equal to accelerated. The terminated subtab may display electronic transfers with the vesting class equal to terminated. The contents of each electronic transfer (e.g., the amount of an electronic payment) may be displayed in a table, such as electronic transfers list 1004, inside of each subtab 1010.

Consistent with disclosed embodiments, each subtab 1010 in the first entity vesting tab may include an amounts data table, such as electronic transfers list 1004, which may display the contents of each electronic transfer (e.g., the amount of an electronic payment). The amounts data table, such as electronic transfers list 1004, may include several columns. The columns may include a name column, which may display the first entity name, or other form of identification, such as an identification number or a username. The name column may also include a link to the first entity dashboard. The columns may include a vesting information column, which may display the vesting date and electronic transfer amount data and authorization data. The columns may include a status column, this may display the electronic transfer status and vesting status (e.g., paid, unpaid). The columns may include a fund information column, which may display the fund data that was loaded into the system for each amount (e.g., escrow fund, vesting fund, or rep fund). The columns may include an authorization date to display the client authorization, a timestamp of the client entity authorization, and/or the username of the entity who authorized the electronic transfer. The columns may include an electronic information column, which may display electronic transfers that were completed. The electronic transfer information column may further include the electronic transfer method, the date of the electronic transfer, and the Fed Ref #. The columns may also include a security information column, which may display a security number, a number of securities, and a date of issuance. The user interface may accommodate long data points so that there is no overlapping. In a long data format, variables may be repeated in a table column in order to reduce the number of overall columns, which may make the table more user-friendly for a mobile graphical user interface.

Figure 10B:
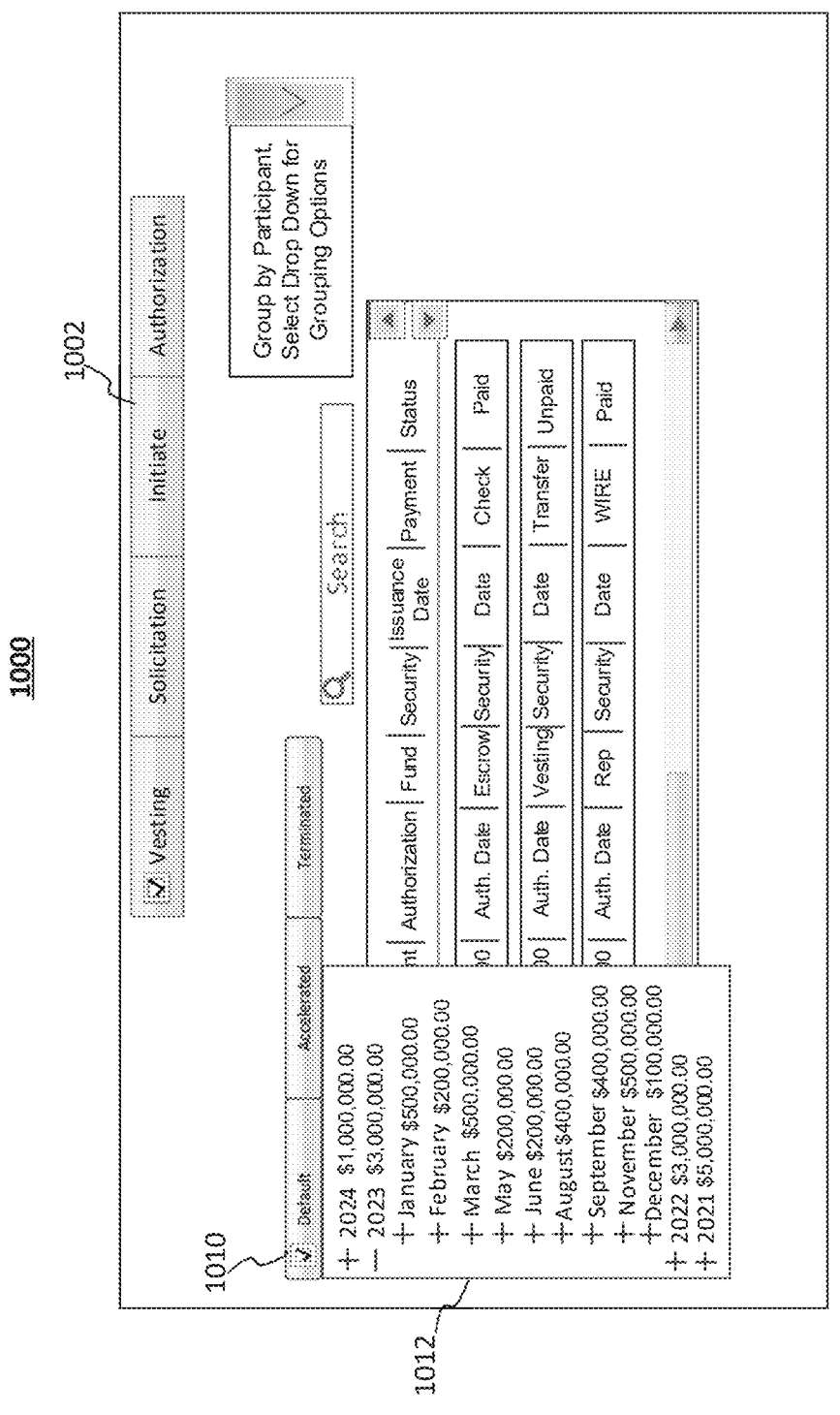
FIG. 10B illustrates an exemplary display on a graphical user interface of a first entity portal displaying an accordion menu associated with an electronic transfers list, consistent with disclosed embodiments.

FIG. 10B depicts a first entity portal 1000 that may be include accordions 1012 that when selected, may display a group of information. The electronic transfers with release equal to vesting and vesting class equal to default may fall under the default subtab. This default subtab may include dynamic accordions 1012. Accordions 1012 may be a menu composed of vertically stacked headers that reveal more details when triggered. Accordions 1012 may highlight the most important information of a section while still making the rest of the information easily accessible. For example, as disclosed herein, accordions 1012 may display the total amount of electronic transfers for each time period, which may provide an easily accessible summary of information while allowing the first entity to access more detailed information by expanding an accordion header. These accordions 1012 may include a header for each year that the vesting date data spans. The accordions 1012 may further include a header for each month within the year that contains a vesting date. In some embodiments, if a month does not have a vesting date, then the month may not be displayed as a header. In each year header and each month header, there may be an amount and electronic transfer totals that may sum up all electronic transfer contents data. When a header from accordion 1012 is selected on the user interface 309, further information may be displayed, such as, for example, the total amount of an electronic transfer, the contents of an electronic transfer, whether the electronic transfer is completed or incomplete, or any other additional information about an electronic transfer. In some embodiments, the information displayed when a header of accordion 1012 is selected may be customizable by a first entity. For example, the first entity may select, though user interface 309, the type of information that may be displayed when a header from accordion 1012 is selected. The electronic transfers with release equal to vesting and vesting class equal to accelerated may fall under the accelerated tab. The accelerated tab may contain similar dynamic accordions to the default tab described above. The electronic transfers with release equal to vesting and vesting class equal to terminated may fall under the terminated tab. The terminated tab may contain similar dynamic accordions to the default tab consistent with those described above.

Figure 10C:
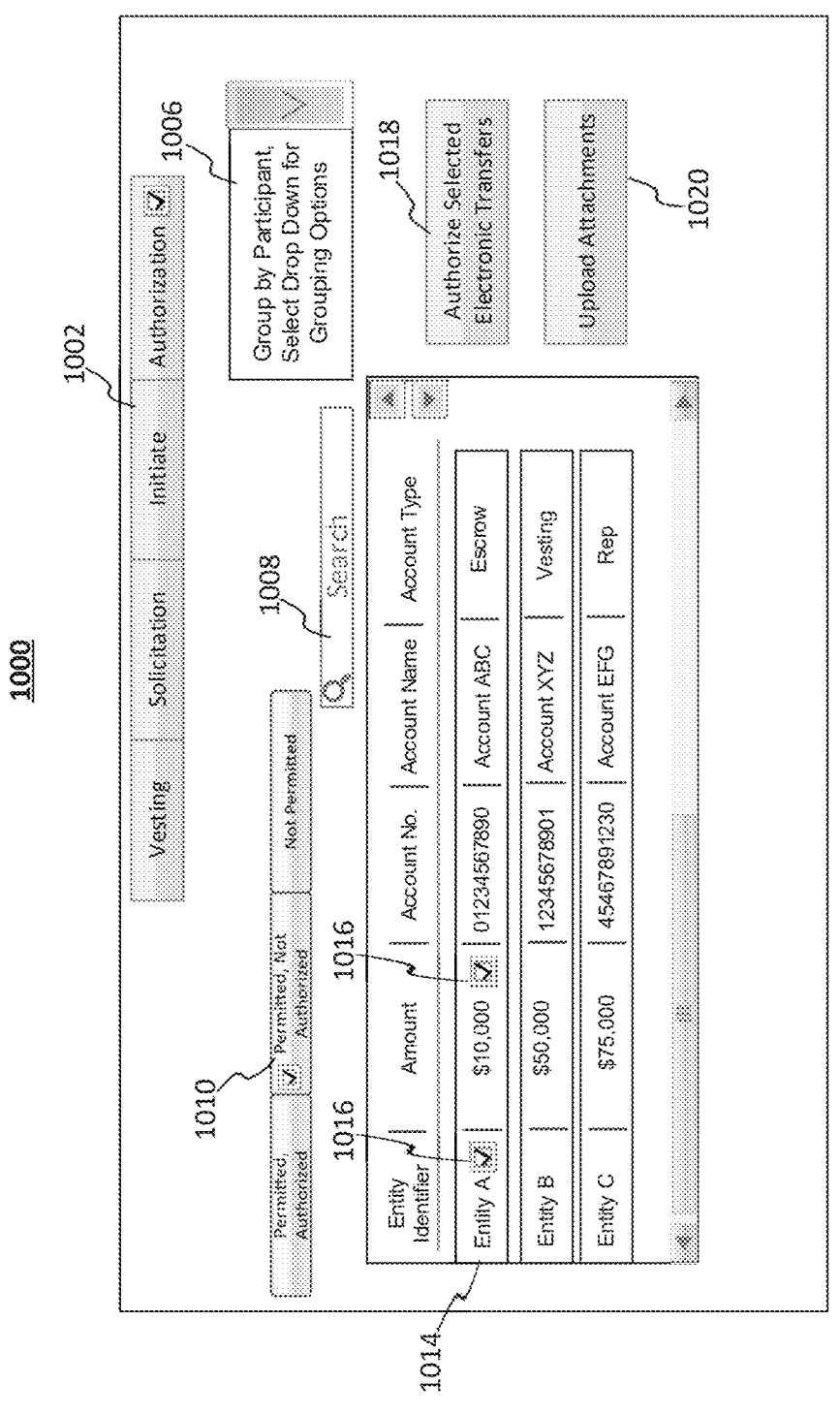
FIG. 10C illustrates an exemplary display on a graphical user interface of a first entity portal displaying an authorization tab, consistent with disclosed embodiments.

FIG. 10C depicts an authorization tab of a first entity portal 1000, which may give a first entity the ability to authorize electronic transfers. This authorization may allow the first entity to verify to the second entity that information regarding the first entity's electronic repository is correct. In some embodiments, the first entity's electronic repository may comprise at least one of a bank account, a checking account, a savings account, or an electronic file folder. For example, the authorization tab may include an electronic transfers list 1014. The electronic transfers list 1014 may include, among other information, the name or other identification of a first entity, an amount associated with an electronic transfer, and repository information. Repository information may include an account number, account name, account type, a payment method, or any other information that may identify a repository. The electronic transfer list 1014 may allow the first entity to verify the details of their electronic repository, which may be the repository that receives the electronic transfer from the second entity. The first entity authorization tab may include an option on the graphical user interface, such as electronic transfer checkbox 1016 or an authorization button 1018. Electronic transfer checkbox 1016 and authorization button 1018 may be elements of information entry fields 310. The first entity authorization tab may include a checkbox 1016 at both the participant and amount levels. The checkbox 1016 at the participant level may authorize electronic transfers to the selected first entity, or from a given first entity or second entity. The checkbox 1016 at the amount level may authorize only electronic transfers at, above, below, or in a given range for the amount of the electronic transfer. In some embodiments, the checkbox 1016 may be selected at the participant level, and all eligible electronic transfers for that first entity may be selected. In some embodiments, the checkbox 1016 may be selected at the amount level, and all electronic transfers involving electronic transfers over a certain amount, under a certain amount, or at a certain amount of electronic funds may be selected. The first entity authorization tab may further include an authorization button 1018. The authorization button 1018 may be included in information entry fields 310. When the authorization button 1018 is selected, it may flag the associated electronic transfer as authorized. Once an electronic transfer is authorized, processor 301 and/or 307 may store the username of the entity who authorized it, along with a timestamp. In some embodiments, processor 301 and/or 307 may further store the name or other identification of a first entity, an amount associated with an electronic transfer, and/or repository information associated with an electronic transfer.

Consistent with disclosed embodiments, an electronic transfer may be authorized by a first entity. If the electronic transfer is eligible to be authorized by a first entity, consistent with disclosed embodiments, then the checkbox 1016 may be enabled in information entry fields 310. A first entity may be restricted from authorizing an electronic transfer, for example, if the transfer authorization is already set to authorized, if the vesting date is in the future, or if the first entity's vesting class equals terminated. If an electronic transfer is restricted from being authorized, then the checkbox 1016 may not be displayed in information entry fields 311 or may be displayed but unable to be selected by a first entity. If a first entity attempts to authorize an electronic transfer that is not eligible for authorization, then an error message may be displayed. This error message may state that "only vesting amounts that have not yet been authorized, that contain a vesting date not in the future (or have a class of accelerated) may be authorized." If an electronic transfer has a transfer authorization of "authorized," and if a first entity changes either the electronic transfer contents (e.g., an amount of at least one electronic transfer), vesting date (e.g., a date that the electronic transfer may be completed), vesting class (e.g., default, accelerated, or terminated), or the type of fund the electronic transfer is associated with (e.g., rep fund, escrow fund, or vesting fund), then the transfer authorization may be set back to "not authorized."

Consistent with disclosed embodiments, authorization evidence may be provided by the first entity through first entity portal 1000. When a user hits the authorization button 1018, a confirmation modal 1020 may appear with the ability to add an attachment. This attachment may include any electronic transfer documents or records the first entity wishes to add. In some embodiments, an authorization confirmation may not be saved until an attachment has been added. In other embodiments, an authorization confirmation may be saved after an attachment has been added. In some embodiments, when saved, the attachment may be stored with all the selected electronic transfer records that were authorized for the first entity.

In some embodiments, electronic transfers may be completed. Consistent with disclosed embodiments, the electronic transfer may be initiated and completed when both the eligibility and authorization are met. In some embodiments, this may require a combination of authorizations from the second entity and the at least one first entity. The first entity may provide its authorization through the first entity portal 1000 using the authorization button 1018 as depicted in FIG. 10C.

Figure 10D:
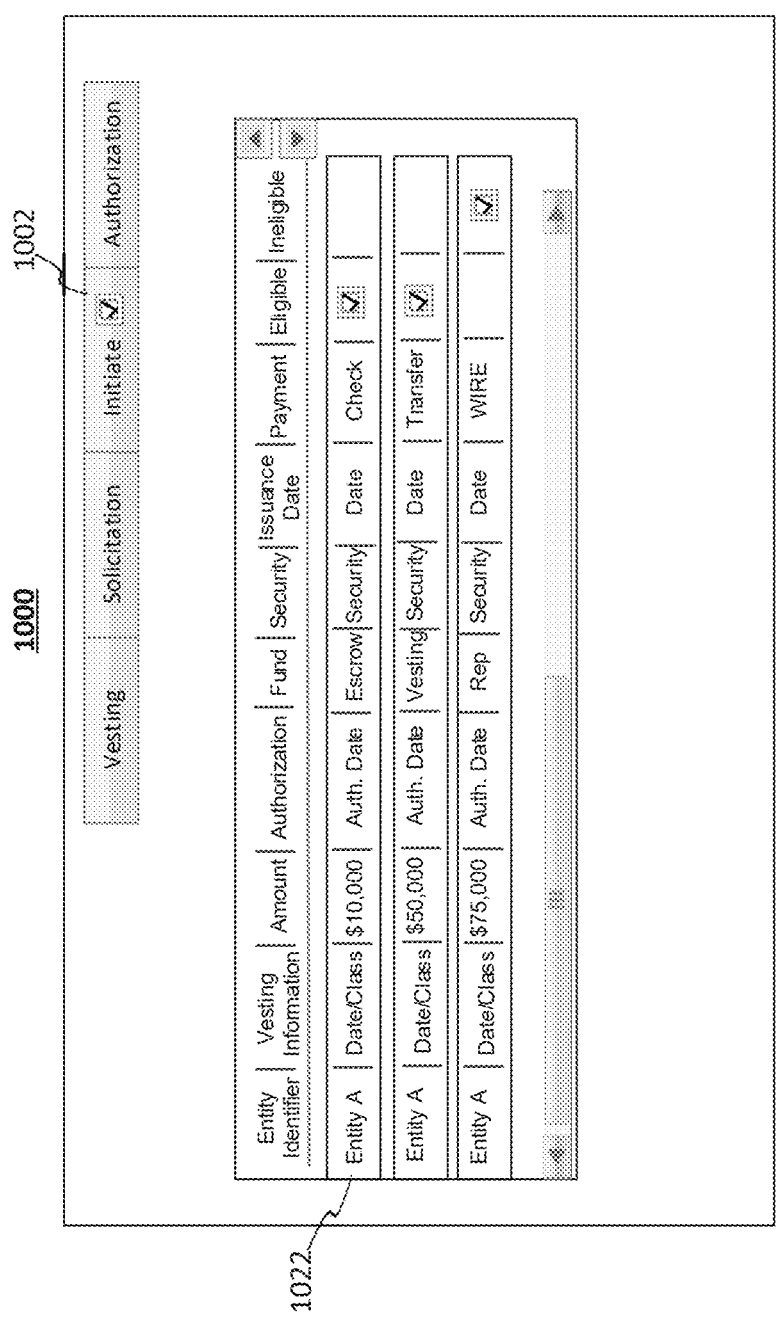
FIG. 10D illustrates an exemplary display on a graphical user interface of a first entity portal displaying an electronic transfers list, consistent with disclosed embodiments.

FIG. 10D depicts an initiated electronic transfers tab of the first entity portal 1000, which may allow a first entity to view a summary of all its electronic transfers in one tab. The initiated electronic transfers tab may include an electronic transfers list 1022. The electronic transfers list 1022 may include an eligible electronic transfers column and an ineligible electronic transfers column. If an electronic transfer is eligible for completion, then it may fall into the eligible transfers column. If an electronic transfer is not eligible for completion, then it may fall into the ineligible transfers column. This initiated electronic transfers tab may allow a first entity to view all of their electronic transfers in one place.

Figure 10E:
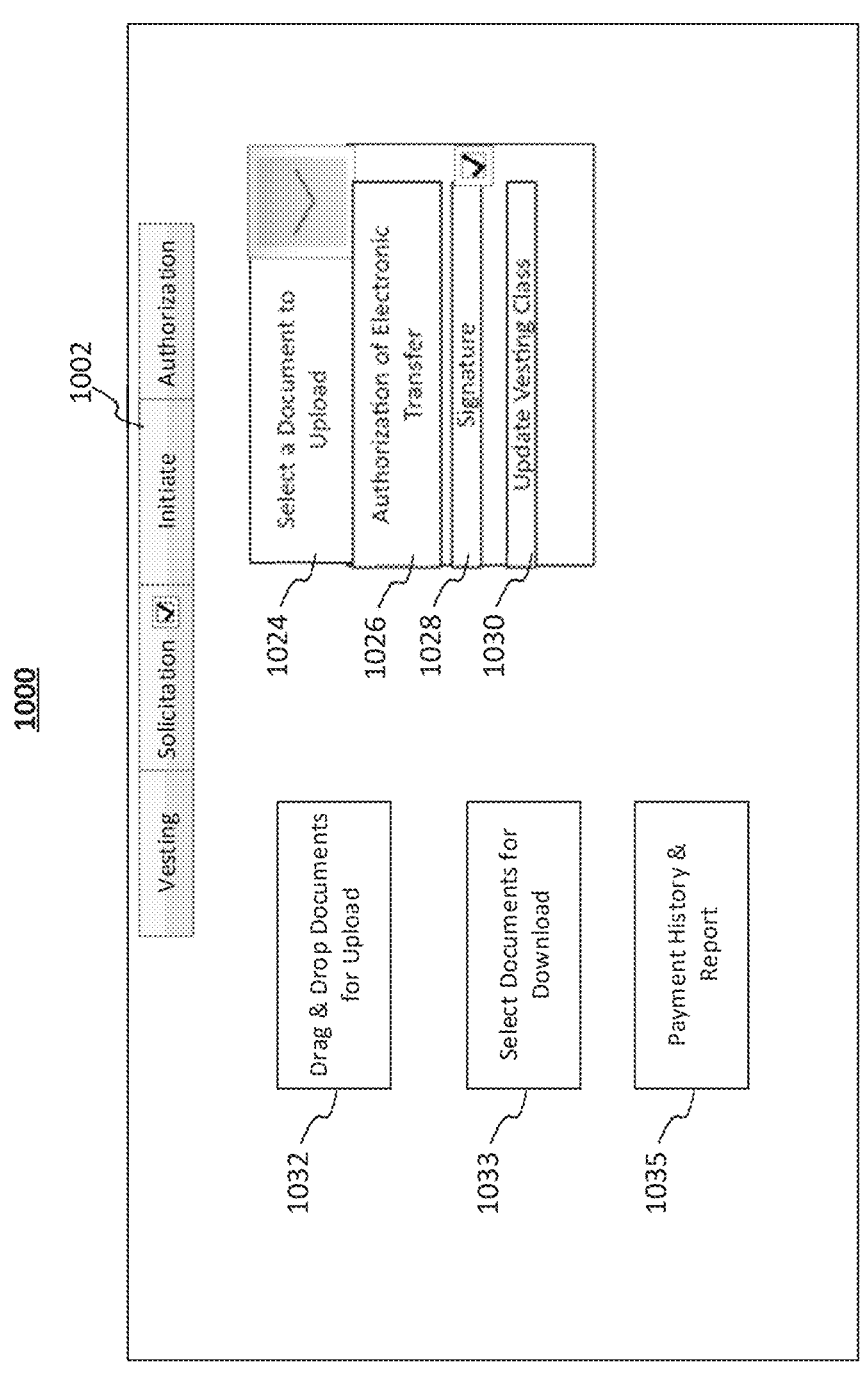
FIG. 10E illustrates an exemplary display on a graphical user interface of a first entity portal wherein documents may be uploaded and downloaded, consistent with disclosed embodiments.

As depicted in FIG. 10E, the plurality of tabs 1002 of the first entity portal 1000 may include a solicitation tab. The solicitation tab may include inputs in information entry fields 310 in first entity computing device 314 that may allow a first entity to solicit an electronic transfer from the second entity. The first entity portal 1000 may include a payable amount spreadsheet in information entry fields 310, which may allow for a first entity to upload new data. In some embodiments, this new data may include a vesting class or a vesting date. In such embodiments, when such information is input, the user interface 309 may display upload confirmation summary table rows, and these rows may display each release type (e.g., default, accelerated, or terminated) and sub type (e.g., optional, freeform, or other) entered by the user. Such new data may be uploaded via the first entity portal 1000 using an exemplary dashboard configuration such as that shown in FIG. 10D. As depicted in FIG. 10E, the solicitation tab may display a drop-down menu 1024 with options for actions such as, for example, "Authorization for Electronic Transfer" 1026, "Signature" 1028, and "Update Vesting Class" 1030. Authorization for Electronic Transfer 1026 may be another way to provide a transfer authorization, consistent with disclosed embodiments. Signature 1028 may be an option to upload evidence of an electronic transfer authorization, which in some embodiments, may be a signature page. The solicitation tab may include an upload modal 1032. In some embodiments, upload modal 1032 may be a confirmation modal that allows for confirmation evidence of a transfer authorization to be uploaded. In other embodiments, upload modal 1032 may allow a first entity to upload new information related to an electronic transfer. For example, upload modal 1032 may be designated as a "Drag & Drop Documents for Upload" modal as displayed in FIG. 10E, that may allow an entity to upload new information about an electronic transfer.

In some embodiments, as depicted in FIG. 10E, the solicitation tab of the first entity portal 1000 may also allow a first entity to download vesting authorization attachments, which may allow the first entity to retrieve a record of their electronic transfers for historical reference. The first entity may download vesting authorization attachments by selecting the download modal 1033, which in some embodiments may be entitled "Select Documents for Download." In some embodiments, the first entity solicitation tab may include a link that may allow for a download of an authorization attachment to the first entity's browser for all electronic transfers that have the transfer authorization set as "authorized." In some embodiments, the first entity may download an electronic transfer spreadsheet. The electronic transfer spreadsheet may include the information displayed in electronic transfer list 1004 or electronic transfer list 1014.

The first entity portal 1000 may include in user interface 309 an amount column. This amount column may display the contents of each electronic transfer associated with the first entity, such as, for example, the exemplary dashboard configurations shown in FIGS. 10A-10D. In some embodiments, the sum of the escrow fund, rep fund, and vesting fund columns may be equal to the value in the amount column. The escrow fund, rep fund, and vesting fund may be different entity repositories storing the contents of one or more electronic transfers, consistent with disclosed embodiments. The amounts column may provide transparency between the first entity and the second entity by clearly displaying the amount of electronic transfers that have been made to the first entity and the amount of electronic transfers that may be made to the first entity at a future date.

In some embodiments, the first entity portal 1000 may include information entry fields 310 and an input field, which may be used for adding electronic transfer adjustments, which may be content or form changes. In some embodiments, a first entity may add electronic transfer adjustments via the upload modal 1032 as depicted in FIG. 10E. For example, if the electronic transfer is a payment of electronic funds, the first entity may request an adjustment be made to the amount of electronic funds. In other embodiments, if the electronic transfer is a transfer of electronic files, the adjustment may be a change to any of the electronic files to be transferred. When a new adjustment is added, an adjustment record may be created in a database, such as database 504.

The first entity dashboard payable amount, such as the amounts displayed in electronic transfer list 1004 or electronic transfer list 1014, may include an "edit amount" redesign feature. The "edit amount" redesign feature may allow for a first entity to adjust vesting amounts so that a proper record of the changes to the vesting amounts over time may be tracked and may be displayed in external portals, such as external portals associated with the first entity's electronic repository. The first entity may have the ability to edit all editable amounts found in electronic transfer list 1004 or electronic transfer list 1014 if the electronic transfer is not completed. The "edit amount" redesign feature may include fields. These fields may include a standard amount editable field. The "edit amount" redesign feature may also include a vesting amount editable field. This field may include a list of the editable electronic transfer, an electronic transfer amount, a vesting date, a vesting class, an escrow fund, a vesting fund, and a rep fund. The sum of all three fund fields may be equal to the amount field. An error message may issue if the sum of the vesting fund, escrow fund, and rep fund does not equal the amount. Once an edit is saved, an adjustment record may be created in the database, such as database 504.

The first entity portal 1000 payable amount displayed in electronic transfer list 1004 or electronic transfer list 1014 may have a "view adjustments" function. An adjustment may be an alteration made to the contents of an electronic transfer made by the second entity or the first entity. For example, if the contents of the electronic transfer are electronic funds, then an alteration may be a change in the amount of a payment of the electronic funds. The "view adjustments" function may allow a transferee to view adjustments for vesting amounts that may allow the participant to view the record of the changes to the vesting amounts over time.

The first entity portal 1000 may include an "initiate electronic transfer" feature. This feature may allow a first entity to add new data points related to amounts displayed in electronic transfers list 1004 or electronic transfers list 1014, which may allow the first entity to load the appropriate data points for the processor 301 and/or 307 to properly handle vesting amount tracking and payment. For example, as vesting information changes over time, a first entity may use the "initiate electronic transfer" feature to update or add new electronic transfer information to electronic transfer list 1004 or electronic transfer list 1014 displayed on first entity portal 1000. In some embodiments, new data points may be added to electronic transfers list 1004 or electronic transfers list 1014 through upload modal 1032.

The "initiate electronic transfer" feature display may include a summary section that may summarize information related to an electronic transfer. The summary section of the "initiate electronic transfer" feature may include a fee and balance summary. The fee and balance summary may include a summarization of wire fees, automated clearing house (ACH) fees, check fees, and payment account balances associated with an electronic transfer. The "initiate electronic transfer" feature display may further include an eligibility summary. The eligibility summary may include columns such as "securityholder," (e.g., a first entity) "disbursing agent," (e.g., a third-party intermediary between a first entity and a second entity for completing an electronic transfer) "transaction expense," (e.g., an amount of the electronic transfer) "escrow agent," (a third-party that may hold funds for the electronic transfer) and "release" (e.g., vesting class of the first entity, such as default, accelerated, or terminated). Each row of the eligibility summary may display a number of eligible payees associated with each column. The "initiate electronic transaction" feature may further include a vesting date column that may further include a vesting date, at the amount level, if the release equals vesting.

The first entity portal 1000 may include a payment "history and report" feature. The payment "history and report" feature may allow a first entity to view a summary of the history of electronic transfers that may be pending or may have been made to the first entity from the second entity. For example, the payment "history and report" feature may include reports regarding electronic transfers that have been initiated, completed, or scheduled. The "history and report" feature may further include reports that may summarize a plurality of electronic transactions. The first entity may review and/or download a payment history and report by selecting the payment history and report modal 1035, as depicted in FIG. 10E. In some embodiments the payment history and report modal 1035 may be entitled "Payment History & Report."

In some embodiments, the processor 301 and/or 307 may not consider an amount as eligible until the vesting date is in the past, so that first entities may not initiate payments until after the vesting date is in the past. In some embodiments, in addition to amounts with release type equal to vesting, the electronic transfer may not be considered as eligible unless the vesting date is in the past or the vesting class equals accelerated. If ineligible, the electronic transfer may fall into a column displayed on the first entity portal 1000, for example, a column titled "ineligible payees/amounts." In some embodiments, if a first entity's vesting class equals accelerated, then the electronic transfer may be considered eligible assuming all other payment eligibility criteria are met (e.g., verification of the first entity's electronic repository, the fund information has been received, etc.).

Second Entity Portal

Figure 11A:
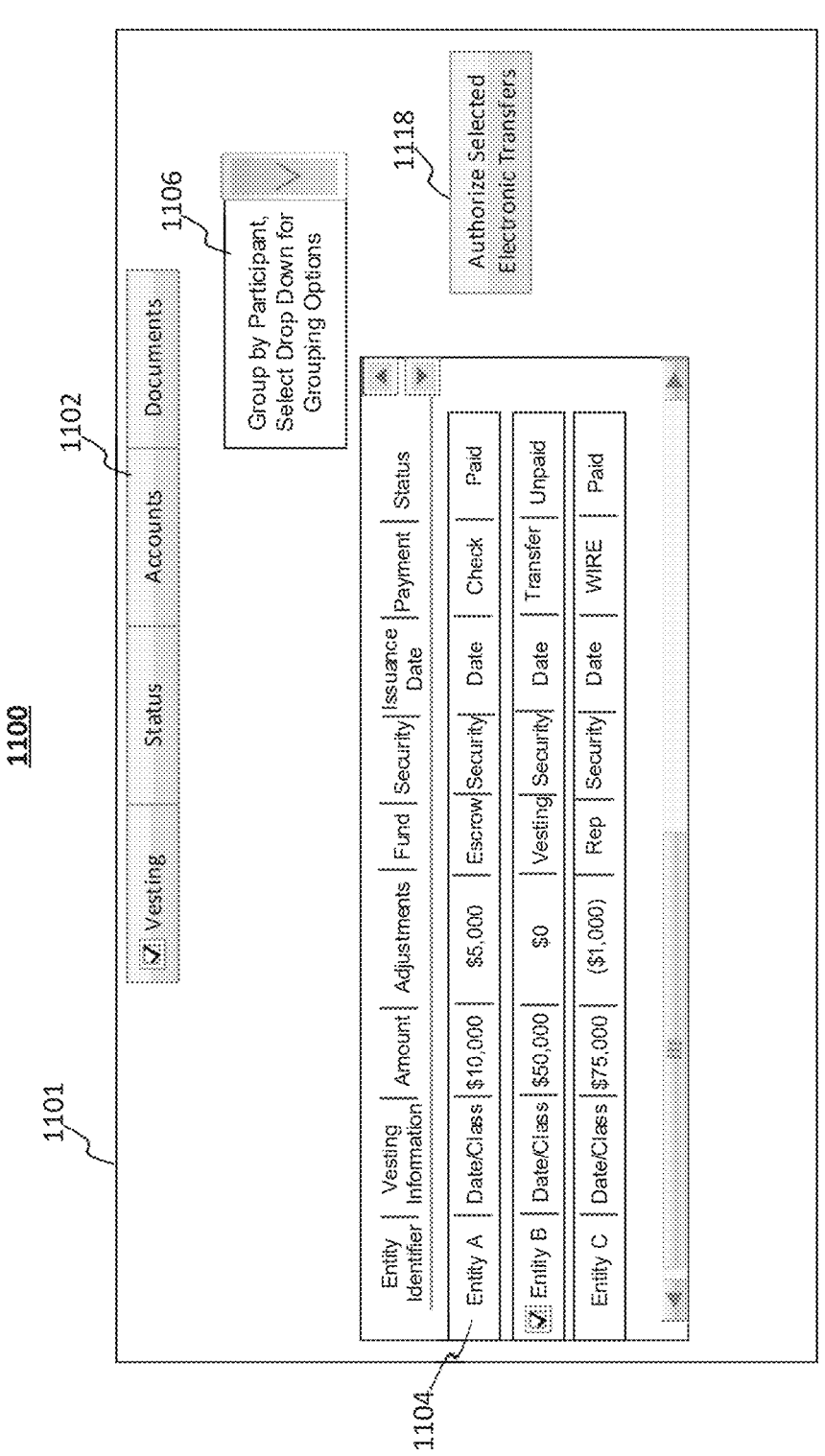
FIG. 11A illustrates an exemplary display on a graphical user interface of a second entity portal displaying an entity list, consistent with disclosed embodiments.

FIG. 11A depicts a second entity portal 1100, which may be accessed by a second entity, such as a client user. The second entity portal 1100 may be included on user interface 309 in second entity computing device 306. The second entity portal 1100 may include a plurality of tabs 1102. The plurality of tabs 1102 may correspond to the plurality of tabs 902, as disclosed herein with respect to FIG. 9A. The plurality of tabs 1102 may include a client vesting tab 1101, as depicted in FIG. 11A.

The client vesting tab 1101 may include a vesting schedule table, such as entity list 1104, that may display participant rows for each first entity. In some embodiments, each first entity row may have an accordion that, when expanded, may display the electronic transfer data associated with that first entity. The entity list 1104 may have columns that may include an electronic transfer contents column that may display the contents of electronic transfers. The entity list 1104 may further include a vesting information column that may display a vesting date and the vesting class for the respective first entity. The entity list 1104 may also have columns that may include fund information. The fund information columns of the entity list 1104 may display fund data for each electronic transfer associated with each first entity. The fund information column may display the fund type for a given entity or electronic transfer. The fund type may comprise, for example, an escrow fund, a vesting fund, or a rep fund. The entity list 1104 may further include a security information column, which may display security numbers, the number of securities, and a date of issuance. The entity list 1104 may further include an electronic transfer information column. The electronic transfers information column may display the electronic transfer method and the electronic transfer date for the last electronic transfer associated with a respective entity. In some embodiments, if the electronic transfer method is WIRE, then the electronic transfer information column may display the Fed Ref #once that the reference number is received from the downstream system.

In some embodiments, as depicted in FIG. 11A, the client vesting tab 1101 of client entity portal 1100 may include a dropdown menu 1106. Dropdown menu 1106 may correspond to dropdown menu 905, as disclosed herein with respect to FIG. 9A. Dropdown menu 1106 may allow a user to select the criteria upon which entity list 1104 may be sorted. In some embodiments, the dropdown menu 1106 may allow a second entity to sort a plurality of electronic transfers displayed in the entity list 1104 by first entity name or identifier. When a second entity uses the "group by participant" feature of the dropdown menu 1106, then processor 301 and/or 307 may sort a table stored in memory 302 and/or 308. The table stored in memory 302 and/308 may correspond to the entity list 1104 displayed on second entity portal 1100. In some embodiments, based on a second entity selection through dropdown menu 1106, processor 301 and/or 307 may sort the electronic transfers displayed in entity list 1104 by the date the electronic transfer information was entered into entity list 1104. In other embodiments, based on a second entity selection through dropdown menu 1106, processor 301 and/or 307 may sort electronic transfers in the entity list 1104 by the transfer authorization (e.g., authorized or not authorized). In other embodiments, based on a second entity selection through dropdown menu 1106, processor 301 and/or 307 may sort the electronic transfers based on the category of fund (e.g., vesting fund, escrow fund, or rep fund). In other embodiments, processor 301 and/or 307 may sort the electronic transfers by the date the electronic transfers were completed.

Consistent with disclosed embodiments, the client vesting tab 1101 may have an accordion for every electronic transfer that has greater than zero adjustments. For example, each of the entities displayed in entity list 1104 of FIG. 11A may include an accordion that may be expandable by a second entity. In some embodiments the first entity may request adjustments to electronic transfers, consistent with disclosed embodiments described above. In other embodiments, the second entity may make adjustments to electronic transfers by interacting with information entry fields 310 on second entity computing device 306. If the electronic transfer is a transfer of electronic funds, then the adjustment may be a change in the amount of the payment. If the electronic transfer is a transfer of electronic files, then the adjustment may be a change to any of the electronic files. By selecting an accordion associated with an entity displayed on entity list 1104, a second entity may be able to view adjustments made to the electronic transfers associated with each entity of entity list 1104.

As depicted in FIG. 11A, the client vesting tab 1101 of second entity portal 1100 may include options to select and authorize electronic transfers. The options to select and authorize electronic transfers may be included in information entry fields 310 in user interface 309 at second entity computing device 306. As depicted in FIG. 11A, the client vesting tab 1101 may include an interactive toggle 1118 that may allow for authorizing a selected electronic transfer or selected group of electronic transfers, such as, for example, those displayed in entity list 1104. Interactive toggle 1118 may correspond to interactive toggle 911, as disclosed herein with respect to FIG. 9D.

In other embodiments, the client vesting tab 1101 may include options to authorize electronic transfers at the participant and amount levels. At the participant level, the second entity may select a first entity and authorize all electronic transfers associated with that first entity. At the amount level, the second entity may authorize all electronic transfers that involve an amount of electronic funds over, under, or equal to a predetermined amount. The client vesting tab 1101 may further include an option for authorizing electronic transfers individually. This option may be an authorized electronic transfer button, such as interactive toggle 1118. The interactive toggle 1118 may become available when some electronic transfers have been selected. When the second entity selects the interactive toggle 1118, the second entity may set the transfer authorization to authorized for all selected electronic transfers. After an electronic transfer is authorized, processor 301 and/or 307 may store the profile username of the second entity who authorized the electronic transfer, as well as a timestamp, in memory 302 and/or 308.

A second entity may authorize an electronic transfer if the transfer authorization is set to "not authorized" and if the vesting date is the present date or in the past, or if the vesting class equals accelerated. For electronic transfers that are eligible for authorization, the client vesting tab 1101 may display an option to authorize the electronic transfer in information entry fields 310 in user interface 309, such as through interactive toggle 1118. A second entity may be restricted from authorizing an electronic transfer in some circumstances. A second entity may be restricted from authorizing an electronic transfer if, for example, (i) the transfer authorization for an electronic transfer is already set to authorized, (ii) the vesting date is in the future and the first entity's vesting class is set to default, or (iii) the first entity's vesting class is set to terminated. The client vesting tab 1101 may hide or make the second entity unable to select the interactive toggle 1118 to authorize electronic transfers that are not eligible for authorization.

In some embodiments, adjustments may be made to electronic transfers. There may be an accordion displayed on the entity list 1104 of second entity portal 1100 through visualization output 311 on user interface 309 in second entity computing device 306 for every electronic transfer that has an adjustment amount greater than zero. The entity list 1104 may also include columns displaying adjustments. In some embodiments, the entity list 1104 may include an adjusted electronic transfer column and an electronic transfer column. The adjusted electronic transfer column may display the amount of adjustments (positive or negative) that may have been made to a particular electronic transfer. The electronic transfer column may display the electronic transfer amount with the adjustments factored in.

Figure 11B:
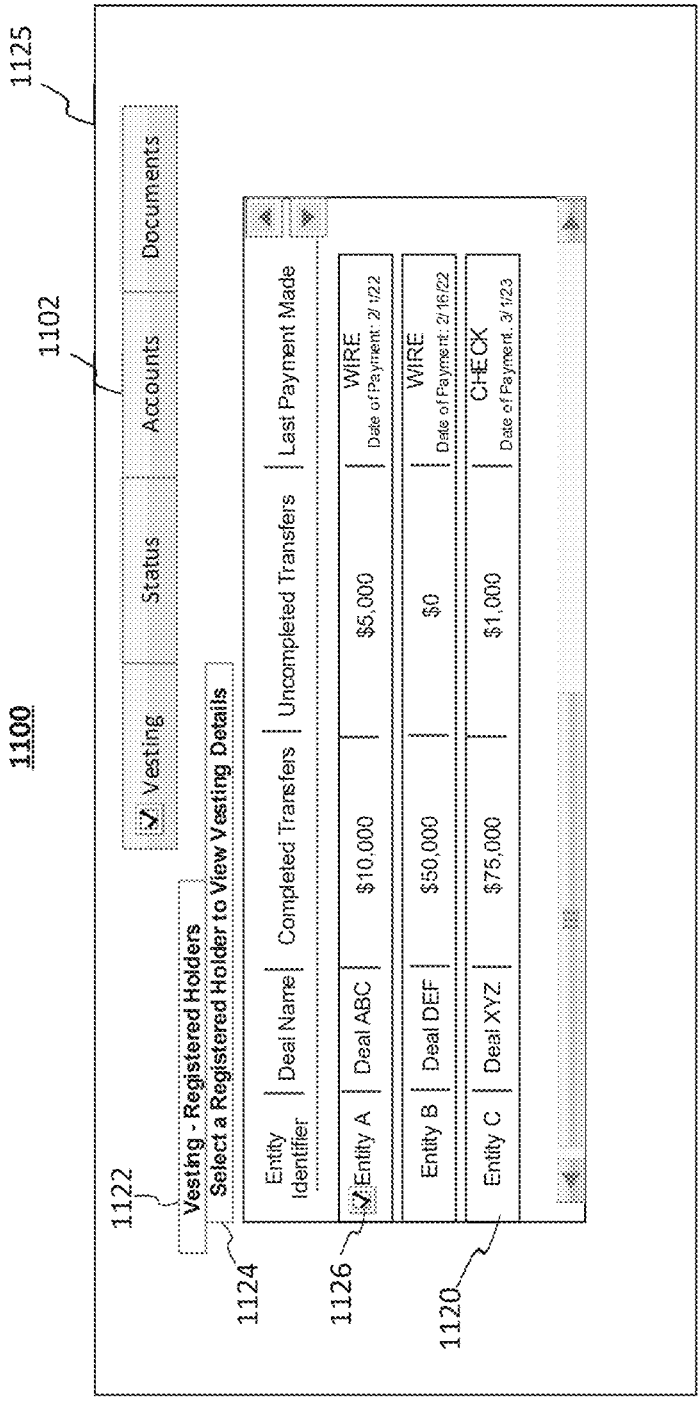
FIG. 11B illustrates an exemplary display on a graphical user interface of a second entity portal displaying a first page associated with a vesting tab, consistent with disclosed embodiments.

In some embodiments, a second entity may be able to view the vesting schedule of electronic transfers for all of their first entities. In these embodiments, as depicted in FIG. 11B, the client vesting tab 1101 may include a first page 1125. The first page 1125 may include a participants list 1120 that may be a list of all first entities associated with the second entity that may contain uncompleted electronic transfers with a release type that is set to vesting. The participants list 1120 may include a header 1122 (e.g., "vesting-registered holder(s)"). The participants list may include a sub-header 1124, which may prompt the user to select a registered holder (e.g., a first entity) to view the vesting details. As depicted in FIG. 11B, participants list 1120 may be a table. The participant list 1120 may include a first column and a second column that may include a first entity name or identifier and a deal name or identifier. The registered holder name may comprise a name or other identifier of a first entity associated with the second entity. The participant list 1120 may include a third column that may include a net vesting summary of the net electronic transfer. For example, this third column may contain a summary of the completed electronic transfers. This may be a sum of all the electronic transfers with release equal to vesting associated with a given first entity. This may also be a sum of all the electronic transfers with release equal to vesting that have a corresponding payment with the status set to "electronic transfer completed."

The participant list 1120 may contain a fourth column that may contain a summary of uncompleted electronic transfers. This column may be a sum of amounts and/or electronic transfer contents with a release type set to "vesting" that do not have a corresponding electronic transfer with the status set to "electronic transfer completed."

The participant list 1120 may include a fifth column that may include data corresponding to the last electronic transfer made to the first entity from the second entity. This fifth column may display the electronic transfer method and date of the last electronic transfer. If this electronic transfer method was WIRE, then the fifth column may also display the Fed Ref # once that data is received from the downstream system. The first page 1125 may display a plurality of first entities through participant list 1120. Each displayed first entity listed on participant list 1120 may include a selectable option 1126. When a selectable option 1126 associated with a first entity of participant list 1120 is selected, the graphical user interface may display a second page, such as second page 1130 as disclosed herein with respect to FIG. 11C.

Figure 11C:
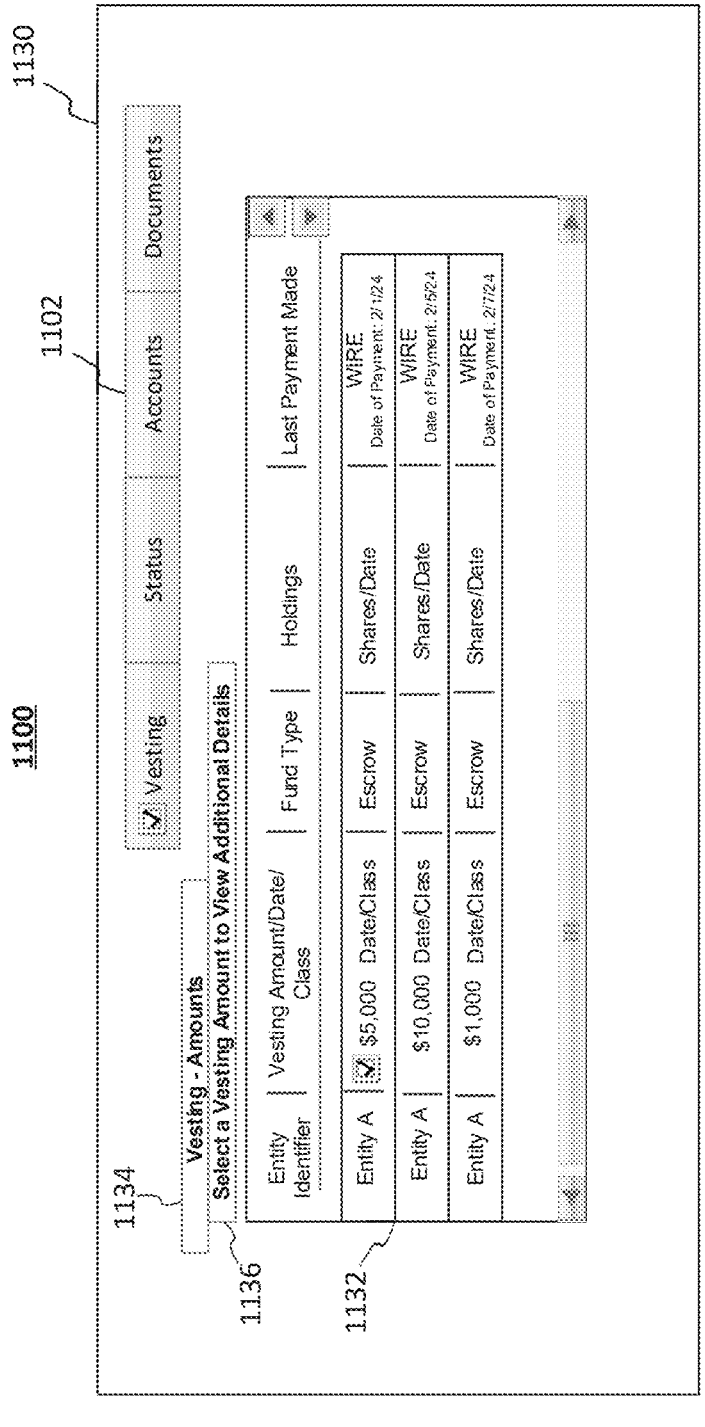
FIG. 11C illustrates an exemplary display on a graphical user interface of a second entity portal displaying a second page associated with a vesting tab, consistent with disclosed embodiments.

The client vesting tab 1101 of the second entity portal 1100 may include a second page 1130, as depicted in FIG. 11C. This second page 1130 may include an electronic transfers list 1132. This second page may include a header 1134 (e.g., "Vesting-Amounts"), and a sub-header 1136 (e.g., "Please select a vesting amount to view additional details."). As depicted in FIG. 11C, the vesting electronic transfers list 1132 may be laid out as a table. The vesting electronic transfers list 1132 may include several columns. The vesting electronic transfers list 1132 may include a first column, which may display the first entity's name or other identifying information. The vesting electronic transfers list 1132 may include a second column that may display the contents of an electronic transfer such as the vesting amount, the vesting date, and the first entity's vesting class. The vesting electronic transfers list 1132 may also include a third column, which may display fund information (e.g., vesting fund, escrow fund, rep fund). The vesting electronic transfers list 1132 may also include a fourth column, which may display holding information (e.g., the holding number, the number of shares, and the date of issuance). The vesting electronic transfers list 1132 may include a fifth column, which may display the electronic transfer information (e.g., the electronic transfer method and the electronic transfer date). The second page 1130 may display a plurality of vesting electronic transfers through vesting electronic transfers list 1132, and each displayed vesting electronic transfer may include a selectable option. When an option to select a vesting electronic transfer is selected on the second page 1130, the graphical user interface may display a third page, such as third page 1140 as disclosed herein with respect to FIG. 11D.

Figure 11D:
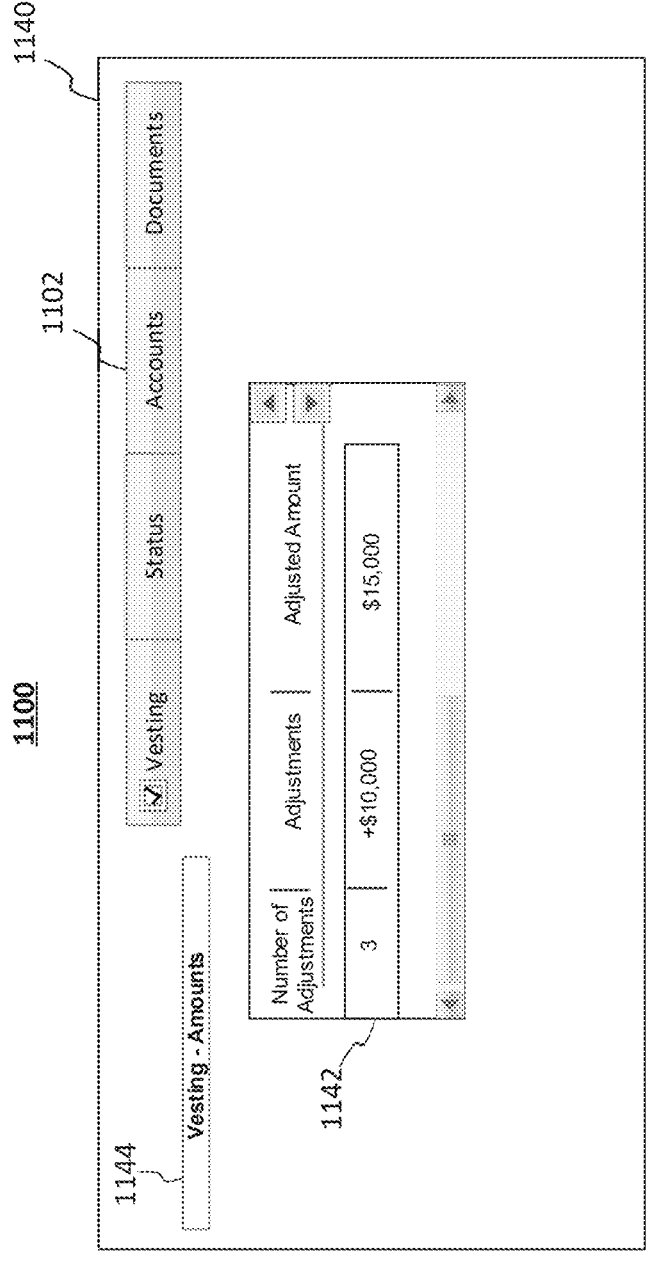
FIG. 11D illustrates an exemplary display on a graphical user interface of a second entity portal displaying a third page associated with a vesting tab, consistent with disclosed embodiments.

The client vesting tab 1101 of the second entity portal 1100 may include a third page 1140, as depicted in FIG. 11D. This third page 1140 may include an adjustment list 1142. An adjustment may be any change made to the contents of the electronic transfer by the second entity or the first entity. When a user selects a vesting electronic amount option on the second page 1130, then the second entity portal 1100 may display third page 1140 displaying adjustments for that vesting electronic transfer. This third page 1140 may include a header 1144 (e.g., "Vesting-Adjustments"). This third page 1140 may include an adjustments list 1142 that may be displayed in a table layout. The adjustments list 1142 may include a first column, which may display the number of adjustments made to the selected electronic transfer. The adjustment list 1142 may include a second column, which may display the positive or negative adjustments made to the selected electronic transfer. The adjustment list 1142 may include a third column that may display the new electronic transfer contents incorporating the adjustments of the second column.

In some embodiments, a vesting report may be created and may be placed in the second entity portal 1100 and first entity portal 1000. This vesting report may contain a plurality of columns. These columns may include the vesting electronic transfer that may display the electronic transfer contents. There may also be a column displaying the electronic transfer method. There may also be a column displaying the employment status of the given first entity. The vesting report may include a solicitation status, currency fields, and the first entity's vesting class.

In some embodiments, processor 301 and/or 307 may track the timestamp of when first entity's vesting classes were updated, which may allow a first entity or a second entity to view a record for historical tracking and transparency. If the electronic transfer release filed is set to vesting, then the vesting class updated timestamp may be updated at a number of different events. For example, it may be updated when a proposed or potential electronic transfer is created for the first time. Additionally, the vesting class timestamp may be updated for an existing outstanding uncompleted electronic transfer. In this case, the processor 301 and/or 307 may compare the current value in the database for the first entity's vesting class with the value being input by the first entity. If the value does not match, then processor 301 and/or 307 may update the timestamp, otherwise, processor 301 and/or 307 may not update the timestamp. Further, the vesting class timestamp may be updated if the release is changed from something other than vesting to vesting.

The disclosed embodiments are not limited to the above-described examples, but instead are defined by the appended claims in light of their full scope of equivalents. Moreover, while illustrative embodiments have been described herein, the scope includes any and all embodiments having equivalent elements, modifications, omissions, combinations (e.g., of aspects across various embodiments), adaptations, or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps.

It is intended, therefore, that the specification and examples be considered as example only, with a true scope and spirit being indicated by the following claims and their full scope of equivalents.

What is claimed is:

1. A method for reconfiguring a plurality of icons on a graphical user interface to optimize memory usage and data transmission efficiency, wherein each of the plurality of icons is associated with an entity, the method comprising:

providing for display, on the graphical user interface:

at least one first tab, wherein each first tab is associated with a vesting class;

a plurality of second tabs, wherein each second tab is associated with one of a plurality of lists;

a first interactive toggle for setting a transfer authorization; and a second interactive toggle for reconfiguring the plurality of icons based on a specific criterion;

receiving a data set for a plurality of first entities, wherein the data set includes, for each of the plurality of first entities, at least one of a first entity identifier, an electronic transfer identifier associated with the first entity, or a vesting date associated with the electronic transfer identifier;

determining, for each first entity, the vesting class based on the received data set;

generating a directory entry for each first entity, wherein each directory entry is stored in a directory associated with a second entity;

storing, in each directory entry, the first entity identifier associated with the first entity, the electronic transfer identifier associated with the first entity, the vesting date associated with the electronic transfer identifier, and the determined vesting class associated with the first entity;

receiving, via the first interactive toggle in the graphical user interface, for each electronic transfer identifier, the transfer authorization associated with the electronic transfer identifier;

determining, for each electronic transfer identifier, a transfer permission associated with the electronic transfer identifier based on the vesting class and the vesting date;

sorting the plurality of first entities into the plurality of lists based on the determined transfer permissions associated with each electronic transfer identifier and the transfer authorizations associated with each electronic transfer identifier;

receiving, via the second interactive toggle in the graphical user interface, a user selection to reconfigure the plurality of icons based on a specific criterion, wherein the specific criterion is the transfer permission, the transfer authorization, and the vesting class;

responsive to receiving the user selection to reconfigure the plurality of icons:

automatically reconfiguring the plurality of icons on the graphical user interface based on vesting class, wherein each icon is visually displayed in one of the at least one first tabs based on vesting class;

automatically reconfiguring the plurality of icons on the graphical user interface based on the plurality of lists, wherein each icon is visually displayed in one of the plurality of second tabs based on the plurality of lists; and displaying, within each icon on the graphical user interface, at least one of the first entity identifier associated with the first entity, the electronic transfer identifier associated with the first entity, the transfer permission associated with the electronic transfer identifier, or the transfer authorization associated with the electronic transfer identifier.

2. The method of claim 1, further comprising automatically recoloring the plurality of icons on the graphical user interface.

3. The method of claim 2, wherein the automatically recoloring comprises one or more of:

automatically coloring an icon green if the transfer permission is set to permitted and the transfer authorization is set to authorized;

automatically coloring an icon red if the transfer permission is set to permitted and the transfer authorized is set to not authorized; and automatically coloring an icon grey if the transfer permission is set to not permitted.

4. The method of claim 1, further comprising:

providing for display, on the graphical user interface, a confirmation modal;

receiving authorization evidence via the confirmation modal; and storing the authorization evidence in the directory entry associated with the first entity associated with the electronic transfer the transfer authorization was received for.

5. The method of claim 1, wherein the first interactive toggle indicates a transfer authorization at at least one of the following levels: a vesting class level, an amount level, or a date level.

6. The method of claim 1, wherein the vesting class is one of default, accelerated, or terminated.

7. The method of claim 6, wherein determining the transfer permission based on the vesting class and the vesting date further comprises: setting the transfer permission to permitted if the vesting class is accelerated.

8. The method of claim 6, wherein determining the transfer permission based on the vesting class and the vesting date further comprises: setting the transfer permission to permitted if the vesting class is default and the vesting date is not in the future.

9. The method of claim 6, wherein determining the transfer permission based on the vesting class and the vesting date further comprises: setting the transfer permission to not permitted if the vesting class is default and the vesting date is in the future.

10. The method of claim 6, wherein determining the transfer permission based on the vesting class and the vesting date further comprises: setting the transfer permission to not permitted if the vesting class is terminated.

11. The method of claim 1, wherein the determining, for each first entity, a vesting class based on the determined weighted average further comprises setting the vesting class to default if the weighed average falls below a predetermined threshold, wherein the predetermined threshold is a number on a scale.

12. The method of claim 1, wherein determining, for each first entity, a vesting class based on the determined weighted average further comprises setting the vesting class to accelerated if the weighted average falls above a predetermined threshold, wherein the predetermined threshold is a number on a scale.

13. The method of claim 1, wherein the directory associated with the second entity is stored in a memory accessible by the second entity, and wherein the second entity may add new directory entries by inputting a supplemental first entity data set.

14. The method of claim 1, wherein the directory associated with the second entity is stored in a memory accessible by the second entity, and wherein the second entity may update existing directory entries, including updating the vesting class of any given first entity, by inputting a supplemental first entity data set.

15. The method of claim 1, wherein the second entity is associated with a second entity repository, and wherein each first entity is associated with a first entity repository.

16. The method of claim 1, wherein the data set for the plurality of first entities further comprises, for each first entity, a first repository status and a first repository type.

17. The method of claim 1, further comprising performing an electronic transfer associated with an electronic transfer identifier from the second entity repository to at least one first entity repository.

18. The method of claim 1, wherein each first entity may access and view the first entity data set associated with the first entity on the graphical user interface, wherein the display of the graphical user interface is divided into tabs, including at least one tab for each electronic transfer identifier associated with the first entity.

19. A non-transitory computer readable medium storing instructions that, when executed by at least one processor, cause the at least one processor to perform operations for reconfiguring a plurality of icons on a graphical user interface to optimize memory usage and data transmission efficiency, wherein each of the plurality of icons is associated with an entity, the method comprising:

providing for display, on the graphical user interface:

at least one first tab, wherein each first tab is associated with a vesting class;

a plurality of second tabs, wherein each second tab is associated with one of a plurality of lists;

a first interactive toggle for setting a transfer authorization; and a second interactive toggle for reconfiguring the plurality of icons based on a specific criterion;

receiving a data set for a plurality of first entities, wherein the data set includes, for each of the plurality of first entities, at least one of a first entity identifier, an electronic transfer identifier associated with the first entity, or a vesting date associated with the electronic transfer identifier;

determining, for each first entity, a vesting class based on the received data set;

generating a directory entry for each first entity, wherein each directory entry is stored in a directory associated with a second entity;

storing, in each directory entry, the first entity identifier associated with the first entity, the electronic transfer identifier associated with the first entity, the vesting date associated with the electronic transfer identifier, and the determined vesting class associated with the first entity;

receiving, via the first interactive toggle in the graphical user interface, for each electronic transfer identifier, the transfer authorization associated with the electronic transfer identifier;

determining, for each electronic transfer identifier, a transfer permission associated with the electronic transfer identifier based on the vesting class and the vesting date;

sorting the plurality of first entities into the plurality of lists based on the determined transfer permissions associated with each electronic transfer identifier and the transfer authorizations associated with each electronic transfer identifier;

receiving, via the second interactive toggle in the graphical user interface, a user selection to reconfigure the plurality of icons based on a specific criterion, wherein the specific criterion is the transfer permission, the transfer authorization, and the vesting class;

responsive to receiving the user selection to reconfigure the plurality of icons:

automatically reconfiguring the plurality of icons on the graphical user interface based on vesting class, wherein each icon is visually displayed in one of the at least one first tabs based on vesting class;

automatically reconfiguring the plurality of icons on the graphical user interface based on the plurality of lists, wherein each icon is visually displayed in one of the plurality of second tabs based on the plurality of lists; and displaying, within each icon on the graphical user interface, at least one of the first entity identifier associated with the first entity, the electronic transfer identifier associated with the first entity, the transfer permission associated with the electronic transfer identifier, or the transfer authorization associated with the electronic transfer identifier.

20. A system for reconfiguring a plurality of icons on a graphical user interface to optimize memory usage and data transmission efficiency, wherein each of the plurality of icons is associated with an entity, the system comprising:

a memory storing instructions; and at least one processor configured execute the instructions to:

provide for display, on the graphical user interface:

at least one first tab, wherein each first tab is associated with a vesting class;

a plurality of second tabs, wherein each second tab is associated with one of a plurality of lists;

a first interactive toggle for setting a transfer authorization; and a second interactive toggle for reconfiguring the plurality of icons based on a specific criterion;

receive a data set for a plurality of first entities, wherein the data set includes, for each of the plurality of first entities, at least one of a first entity identifier, an electronic transfer identifier associated with the first entity, or a vesting date associated with the electronic transfer identifier;

determine, for each first entity, the vesting class based on the received data set;

generate a directory entry for each first entity, wherein each directory entry is stored in a directory associated with a second entity;

store, in each directory entry, the first entity identifier associated with the first entity, the electronic transfer identifier associated with the first entity, the vesting date associated with the electronic transfer identifier, and the determined vesting class associated with the first entity;

receive, via the first interactive toggle in the graphical user interface, for each electronic transfer identifier, the transfer authorization associated with the electronic transfer identifier;

determine, for each electronic transfer identifier, a transfer permission associated with the electronic transfer identifier based on the vesting class and the vesting date;

sort the plurality of first entities into the plurality of lists based on the determined transfer permissions associated with each electronic transfer identifier and the transfer authorizations associated with each electronic transfer identifier;

receive, via the second interactive toggle in the graphical user interface, a user selection to reconfigure the plurality of icons based on a specific criterion, wherein the specific criterion is the transfer permission, the transfer authorization, and the vesting class;

responsive to receiving the user selection to reconfigure the plurality of icons:

automatically reconfigure the plurality of icons on the graphical user interface based on vesting class, wherein each icon is visually displayed in one of the at least one first tabs based on vesting class;

automatically reconfigure the plurality of icons on the graphical user interface based on the plurality of lists, wherein each icon is visually displayed in one of the plurality of second tabs based on the plurality of lists; and display, within each icon on the graphical user interface, at least one of the first entity identifier associated with the first entity, the electronic transfer identifier associated with the first entity, the transfer permission associated with the electronic transfer identifier, or the transfer authorization associated with the electronic transfer identifier.

* * * * *